(12) United States Patent
Edwin et al.

(10) Patent No.: US 12,511,784 B1
(45) Date of Patent: Dec. 30, 2025

(54) INFIELD CAMERA CALIBRATION USING DISPLAY DEVICE

(71) Applicant: Apple Inc., Cupertino, CA (US)

(72) Inventors: Lionel E Edwin, Hollywood, FL (US); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 18/468,233

(22) Filed: Sep. 15, 2023

Related U.S. Application Data

(60) Provisional application No. 63/376,760, filed on Sep. 22, 2022.

(51) Int. Cl.
*H04N 13/246* (2018.01)
*G02B 27/00* (2006.01)
*G02B 27/01* (2006.01)
*G06T 7/80* (2017.01)

(52) U.S. Cl.
CPC .............. *G06T 7/85* (2017.01); *G02B 27/0093* (2013.01); *G02B 27/0172* (2013.01); *H04N 13/246* (2018.05); *G02B 2027/0134* (2013.01)

(58) Field of Classification Search
CPC .. G06T 7/85; G02B 27/0093; G02B 27/0172; G02B 2027/0134; H04N 13/246
See application file for complete search history.

(56) References Cited

U.S. PATENT DOCUMENTS

| 10,776,954 B2 | 9/2020 | Bleyer et al. |
| 11,354,787 B2 | 6/2022 | Selstad et al. |
| 11,720,313 B2 | 8/2023 | Kakizaki et al. |

*Primary Examiner* — Tat C Chio
(74) *Attorney, Agent, or Firm* — Alexander A. Knapp; Kowert, Hood, Munyon, Rankin & Goetzel, P.C.

(57) ABSTRACT

Methods for performing a camera calibration process for outward-facing cameras on devices such as head-mounted display devices are disclosed. Using a second device, a calibration process for the outward-facing cameras on a first device may be performed. Communications of information for a calibration scheme comprising a ground truth comprising features and respective distance separating the features currently displayed or to be displayed may be performed between the first and second device. Calibration parameters may be determined by comparing identified features in captured images of the calibration scheme displayed on the second device to the ground truth.

20 Claims, 17 Drawing Sheets

Time step 1

Time step 1+J+K

Time step 1+J+K+L

INFIELD CAMERA CALIBRATION USING DISPLAY DEVICE

PRIORITY DATA

This application claims benefit of priority to U.S. Provisional Application Ser. No. 63/376,760, entitled "Infield Camera Calibration Using Display Device", filed Sep. 22, 2022, and which is incorporated herein by reference in its entirety.

BACKGROUND

Discussion of Background

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and systems for calibrating cameras on devices, such as head-mounted display devices (HMDs) including but not limited to HMDs used in virtual reality (VR), augmented reality (AR), mixed reality (MR), and/or extended reality (XR) applications, are described. Also, in some embodiments, the methods and systems described herein may be used to calibrate cameras on other types of devices, such as phones, laptops, watches, or other electronic devices. In some embodiments, HMDs may include wearable devices such as headsets, helmets, goggles, or glasses. A system may include an HMD which may include one or more cameras that may be used to capture still images or video frames of the user's environment. The HMD may include lenses or displays positioned in front of the eyes through which the wearer can view the environment. In such systems, virtual content may be displayed on or projected onto these lenses or displays to make the virtual content visible to the wearer. In some embodiments, the wearer (e.g., user) may view the virtual content while still being able to view the real environment through the lenses.

Camera calibration processes described herein pertain to conducting a lightweight and efficient camera calibration process for recalibration of one camera or multiple cameras of a device, such as an HMD or various other types of devices. A calibration process may comprise multiple instructions that can be executed using one or more processors of a device. The processors, when executing the instructions, may be configured to initiate a calibration session between a first and a second device to calibrate one or more cameras of the first device. The processors, when executing the instructions, may also be configured to perform the calibration session in a way such that a user of the first or second device is not made aware that the calibration session is being performed (e.g., without notification to the user of the calibration session), which may allow the calibration session to be performed without disrupting use of the first and second devices. The processors, when executing the instructions, may be configured to cause information to be communicated between the first and second devices for a calibration scheme that is to be displayed or that is currently displayed at the second device and observable by the one or more cameras of the first device. The calibration scheme may include information defining a ground truth comprising features pertaining to one or more images displayed, or to be displayed, at the second device and respective distances between the features. For example, the ground truth may indicate features displayed (or to be displayed) on the second device display and distances between the features that can be used by the first device to compare against images captured by cameras of the first device that are viewing the features displayed on the display of the second device. Comparison of the features and respective distances in the ground truth information to locations of the features as represented in images captured by the one or more cameras of the first device may be used to determine calibration parameters for the one or more cameras of the first device.

In some embodiments, in order to perform the calibration session without notification to the user, the one or more processors may be configured, when executing the instructions, to receive eye tracking information from an eye tracking module of the first device, and determine based on the eye tracking information whether the eye direction of the user is directed away from the second device, and cause, in response to determining the user is looking away, a known calibration scheme to be displayed on the second device. In such embodiments, the known calibration scheme may be a ground truth that is known to the first device, and which can be used by the first device to determine calibration parameters via comparison to how the known calibration scheme is represented in images captured using the one or more cameras of the first device. Additionally, or alternatively, in some embodiments, performing the calibration session without notification to the user may include configuring the processors, when executing the instructions, to cause features to be extracted from an image displayed on the second device, to cause respective distances separating the extracted features to be determined, and to use the two or more of the extracted features and respective distances as the ground truth. The features may be extracted from images that would have been displayed on the second device regardless as to whether or not a calibration session is initiated, such as text messages, internet pages, or any other content the user may be viewing on the second device. However, since only features and not the actual content are extracted, the information provided to the first device for use in calibration may not reveal the meaning of the content displayed on the second device.

For the calibration process, the processors may be configured, when executing the instructions, to cause one or more images of the calibration scheme displayed on the second device to be captured by one or more cameras of the first device. Further, the processors may be configured, when executing the instructions, to identify features in the captured one or more images and respective distances between the identified features and to use this information to determine one or more calibration parameters for the one or more cameras of the first device by comparing the ground truth to the identified features and respective distances. Furthermore, the processors may be configured, when executing the instructions, to provide the calibration parameters to one or more components of the first device, such as modules that process image data captured via the one or more cameras.

Figure 1:
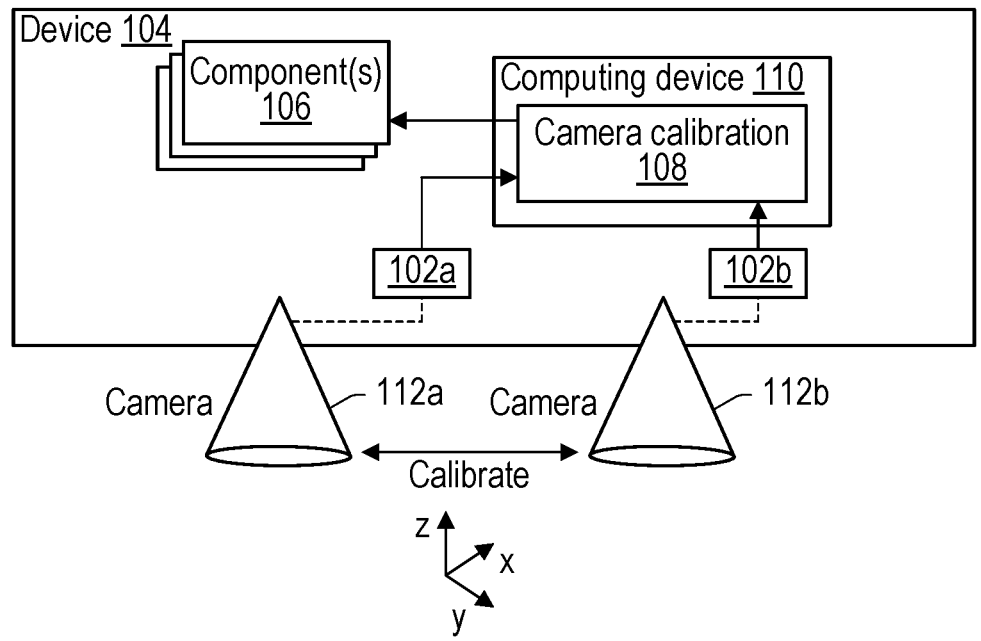
FIG. 1 is a block-diagram illustrating a first device and a second device, wherein one or more cameras of the first device are calibrated using a calibration scheme displayed on the second device, wherein, during an initiated calibration session, the first device and the second device communicate with one another to share information regarding the calibration scheme, according to some embodiments.
Figure 1:
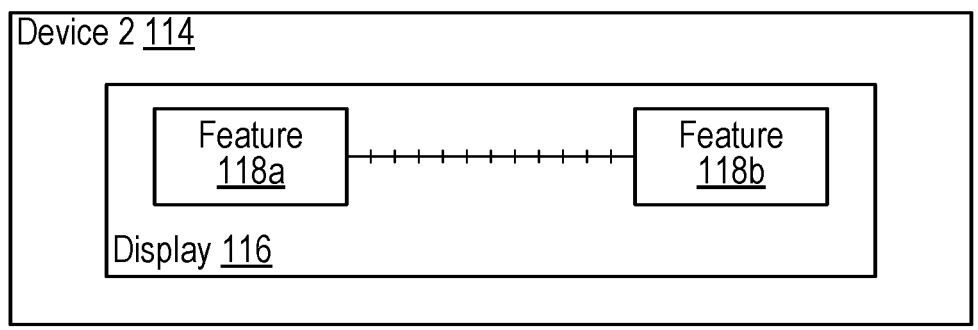

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and techniques for performing camera calibration processes for devices, such as head-mounted display devices (HMDs), are described. During usage of a given device (such as a HMD), parameters of cameras of the device may drift from original calibration values (e.g., due to thermal effects, due to aging of materials, due to a drop event, etc.) and may require recalibration of the cameras to be performed in a way that is both robust and efficient for the device (e.g., depending upon current power availability/consumption of the device, user comfort, the running of additional programs/algorithms that also may require processing power, etc.). This may also be referred to as an "in the field" calibration of the camera because the calibration takes places in a field environment as opposed to in a factory at the time of manufacture of the device.

For example, one or more calibration parameters of cameras of a given device may need to be calibrated throughout the usage of the device, such as intrinsic parameters of the cameras (e.g., focal lengths, principal points, etc.) and/or extrinsic parameters of the cameras (e.g., rotational parameters, translational parameters, etc.). Extrinsic parameters of a camera may be used herein to refer to rotational and translational orientation of the camera relative to a rigid body of a given device and/or another component of the given device. Additionally, extrinsic parameters determined via a calibration process, as described herein, may include any other relevant extrinsic parameters for a camera as would be generally understood by those skilled in the art. For example, extrinsic parameters may define a pose (e.g., position and/or orientation) of the camera relative to a reference structure, such as a frame of a device, another camera, an inertial measurement unit, or other suitable reference. In a similar manner, intrinsic parameters, as used herein, should be understood to encompass various types of internal parameters related to cameras, such as a focal length, a pixel size, an image origin, and/or other parameters used by those skilled in the art to specify internal parameters of a camera.

In some embodiments, cameras may be mounted on a device, such as a head-mounted display device, and/or another device that may require in the field recalibration for calibration parameters of the cameras. Head-mounted display devices may include wearable devices such as headsets, helmets, goggles, or glasses. In some embodiments, a system may include a head-mounted display device which may include cameras that may be used to capture still images or video frames of the user's environment. In addition, a head-mounted display device may be implemented that does not necessarily provide certain AR/VR/MR/XR capabilities but that does include one or more cameras that may be used to capture still images or video frames of the user's environment. The head-mounted display device may include lenses and/or displays positioned in front of the eyes through which the wearer can view the environment. In some systems, virtual content may be displayed on or projected onto these lenses to make the virtual content visible to the wearer (e.g., user) while still being able to view the real environment through the lenses. Also, in some embodiments, the methods and systems described herein may be used to calibrate cameras on other types of devices, such as phones, laptops, watches, or other electronic devices.

A calibration process may comprise multiple instructions that can be executed using one or more processors of a first device, a second device, and/or a third device. The processors of any one of the devices, when executing the instructions, may be configured to initiate a calibration session between a first device and a second device to calibrate one or more cameras of the first device. The processors, when executing the instructions, may also be configured to perform the calibration session without notification to a user which may allow the calibration session to be performed without disrupting the user's use of the device. Additionally, the processors, when executing the instructions, may be configured to communicate information for a calibration scheme that is to be displayed, or that is currently displayed, at the second device and observable by the one or more cameras of the first device, wherein the calibration scheme is to be used in performing the calibration. The calibration scheme may comprise a ground truth that includes features pertaining to the second device and respective distances between the features.

In some embodiments, in order to perform the calibration session without notification to the user, the instructions may be configured to cause one or more processors to receive eye tracking information from an eye tracking module of the first device, determine based on the eye tracking information whether the eye direction of the user of the first device is directed away from the second device, and cause, in response to determining the user is looking away, a known calibration scheme to be displayed on the second device. Additionally, or alternatively, in some embodiments performing the calibration session without notification to the user may include configuring the processors, when executing the instructions, to cause features to be extracted from an image displayed on the second device, to cause respective distances separating the extracted features to be determined, and to use two or more of the extracted features and respective distances as the ground truth. In some embodiments, the two or more of the extracted features may be selected based on having a feature quality score greater than a threshold amount. In some embodiments, the processors, when executing the instructions, may be configured to extract features that have been anonymized such that the features communicated between devices do not include personally identifiable information. For example, if the image displayed on the second device is text messages, the features may comprise a non-identifiable part of the text messages. Also, in some embodiments, the processors may also be configured, when executing the instructions, to perform the communication between the devices through a private communication path, such as an encrypted communication channel.

To execute the calibration process, the processors may be configured, when executing the instructions, to cause one or more images of the calibration scheme displayed on the second device to be captured by the set of one or more cameras of the first device. Further, the processors may be configured, when executing the instructions, to identify features in the captured one or more images and respective distances between the identified features. The processors may be configured, when executing the instructions, to determine one or more calibration parameters for the one or more cameras of the first device by comparing the ground truth (e.g., known features and distances of the calibration scheme) to the identified features and respective distances, identified in the captured images, captured by the one or more cameras of the first device. The processors may further be configured, when executing the instructions, to provide said calibration parameters to one or more components of the first device. For example, various image processing components of the first device (or another device) may adjust how images are rendered or otherwise used based on camera calibration parameters.

The calibration process may enable camera performance similar to performance initially achieved using factory calibration conditions since the processors may be able to use information including the features and distances separating the features of the calibration scheme and the specification information from the second device comprising display characteristics of the second device to conduct a calibration session that has an error rate and/or tolerances similar to those of the factory calibration conditions.

In some embodiments, the camera calibration process described herein may be used as an alternative to performing a computationally intensive and/or power consuming camera calibration process (e.g., a large optimization problem pertaining to all intrinsic and extrinsic parameters of the cameras, an optimization problem that may require calibrated parameters of one or more other components of the device such as an inertial measurement unit, etc.). For example, it may be advantageous for a device to perform a lighter weight camera calibration session by communicating between a first and second device to calibrate cameras of the first device using a shared ground truth. In some embodiments, in order to further lighten a processing and/or power load associated with a calibration session, the processors of the first device, when executing the instructions, may send the task of identifying the features and respective distances in the captured images and the task of determining the one or more calibration parameters for the one or more cameras of the first device for execution on the second or a third device. For example, in some embodiments, wherein the first device is a head mounted display and the second device is a phone, tablet, laptop, etc. The head mounted display may offload computational tasks to the phone, tablet, laptop, etc. Also, in some embodiments, the computational tasks may be offloaded to a third device, in such an example, the first device may be a head mounted display, the second device may be a phone, and the third device to which the computational tasks are offloaded to may be a laptop within communications range of the first or second device (e.g., the head mounted display or the phone, as a few examples).

This written description continues with a general description of camera calibration processes. Examples of recalibrating cameras, via communicating information for a calibration scheme with a first and second device and determining calibration parameters based on comparing a ground truth of the calibration scheme to identified features and respective distances in captured images of a display of the second device are then discussed. Finally, a description of an example computing system upon which the various components, modules, systems, devices, and/or calibration algorithms may be implemented is provided. Various examples are provided throughout the specification. A person having ordinary skill in the art should also understand that the previous and following description of camera calibration processes is not to be construed as limiting as to the implementation of the calibration processes, or portions thereof.

FIG. 1 is a block-diagram illustrating a first device and a second device, wherein one or more cameras of the first device are calibrated using a calibration scheme displayed on the second device, wherein, during an initiated calibration session, the first device and the second device communicate with one another to share information regarding the calibration scheme, according to some embodiments.

In some embodiments, calibrating one or more cameras of a device, such as cameras 112*a* and 112*b* of device 104, may resemble embodiments as shown in FIG. 1. The cameras 112*a* and 112*b* may be outward-facing cameras that capture images 102*a* and 102*b* of a display 116 of a second device 114 (for example additional details related to the outward facing cameras and example embodiments of the first and second device are included in the description for devices 1100, 1200, and 1300 herein). Cameras 112*a* and 112*b* may have camera calibration parameters, such as extrinsic parameters (e.g., relative rotational and translational parameters) and intrinsic parameters (e.g., respective principal points and focal lengths), that may be calibrated and/or recalibrated throughout a useful life of a given device comprising cameras 112*a* and 112*b*, such as device 104, according to some embodiments. Some or all of such parameters may define a geometric relationship between the cameras with respect to one another, and/or geometric relationships between the cameras and other components of a given device, such as other physical components of device 104, according to some embodiments.

In some embodiments, such as those shown in FIG. 1, one or more of the cameras 112*a* and 112*b* may be mounted and/or connected onto a frame of device 104. In such embodiments, the device may include components 106 and a computing device 110, wherein computing device 110 stores program instructions for implementing one or more camera calibration processes 108, which are further described in FIG. 2. In some embodiments, cameras 112*a* and 112*n* and components 106 may be mounted on a non-rigid body of a given device, such as device 104, that is converted into a rigid arrangement when worn by a user. For example, an elastic band to which the components are attached may function as a rigid structure when tightly affixed to a user's body, such as the user's head.

In some embodiments, a calibration scheme used during a given calibration session, displayed on a second device 114, may comprise a ground truth comprising features 118*a* and 118*b* pertaining to an image displayed on a display of the second device 114 and respective distances between the features 118*a* and 118*b*. In some embodiments, one or more physical features of the second device 114 may additionally (or alternatively) be used as a feature in addition to (or instead of) features 118*a* and 118*b* displayed on display 116 of the second device 114). During the calibration session, information regarding the calibration scheme may be communicated between the first device 104 and the second device 114. Images 102*a* and 102*b*, captured by cameras 112*a* and 112*b*, respectively, may be sent to the one or more camera calibration processes 108 for use in performing the calibration. Determined calibration parameters determined by the camera calibration processes 108 may be provided to one or more components 106 of the device 104 that use calibration parameters to process or render images captured via cameras 112*a* and/or 112*b*. For example, in some embodiments, one or more components 106 may be configured to use the determined calibration parameters to adjust image data from the one or more cameras 112*a* and 112*b*. As another example, in some embodiments, the displays, such as the displays 1106 or 1206 and 1208 on device 1100 and 1200 of FIGS. 11 and 12, may be configured to display images generated by the one or more components 106 using the adjusted image data.

Figure 13B:
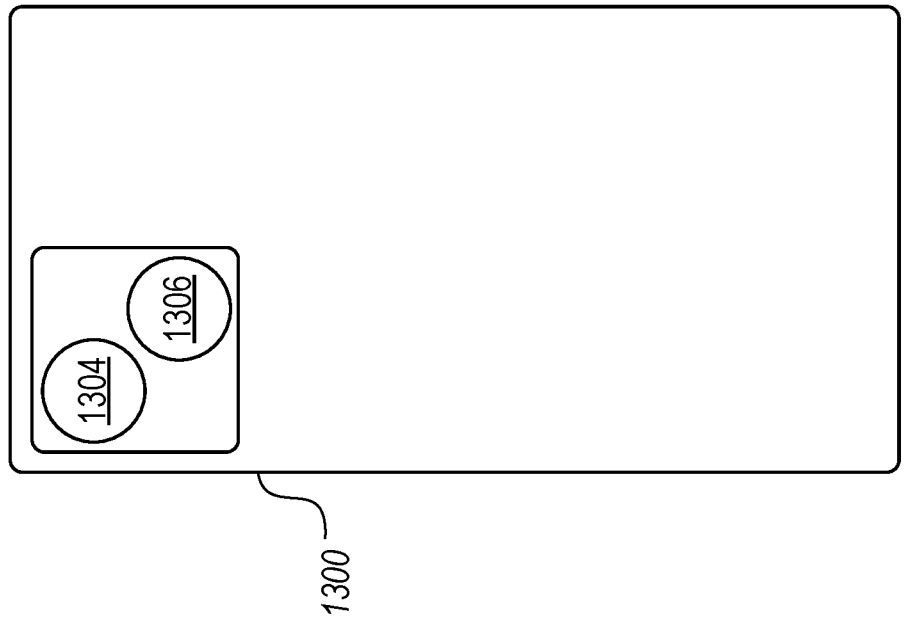
FIGS. 13A and 13B illustrate a front and rear view, respectively, of an example device onto which multiple cameras may be mounted, according to some embodiments.
Figure 13A:
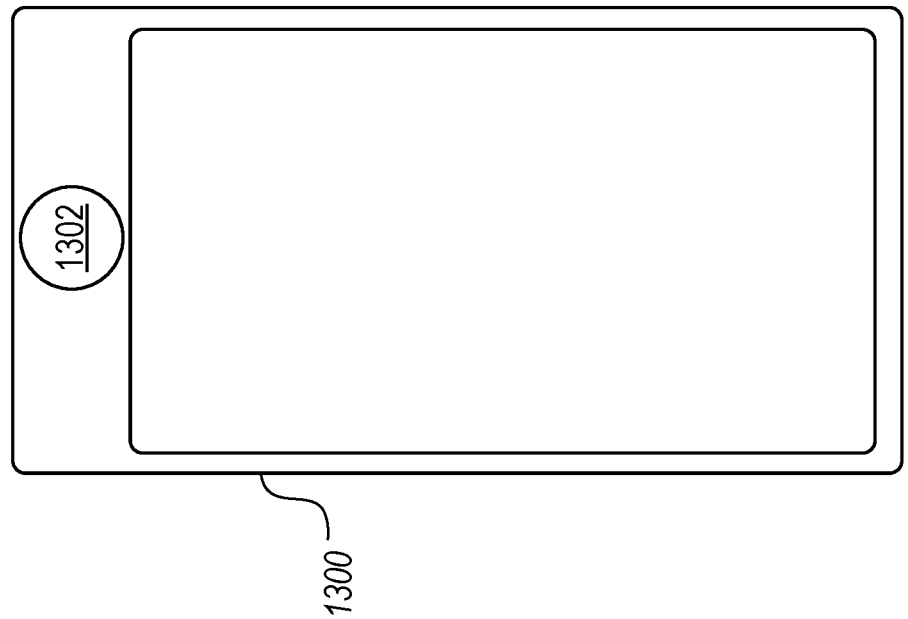

In some embodiments, the second device 114 may resemble embodiments such as shown in FIG. 13A and FIG. 13B, or any other suitable electronic device comprising a display configured to display a calibration scheme. A display 116 of a second device 114 may be within one or more of the fields of view of the one or more cameras 112*a* and 112*b*. In some embodiments, the calibration process, as described herein, may be performed with a single camera or multiple cameras as shown in FIG. 1. The display 116 of the second device 114 may be included in the captured images 102*a* and 102*b* and therefore the features 118*a* and 118*b* displayed on the display 116 and their respective distances separating each other on the display may also be included in the captured images 102*a* and 102*b*. In some embodiments features may be included in images displayed on display 116 and may additionally include one or more features physically present on device 114, such as a frame of the display 116, etc. For example, features that are selected to be used for camera calibration processes may include sets of one or more points within the display 116 of the second device 114 and/or points outside of the display 116. A person having ordinary skill in the art should understand that the features 118*a* and 118*b* are meant to be representative of given distinct and/or identifiable components of an image displayed on display 116 of the second device 114 (e.g., components at various distances between one another), and should not be misconstrued as being representative of the only types of features that may be selected. Alternatively, or additionally, in some embodiments the features 118*a* and 118*b* used in the calibration scheme may include physical characteristics of the display 116 that may be used in the calibration process along with the features displayed on the display (or in place of the features displayed on the display).

Figure 2:
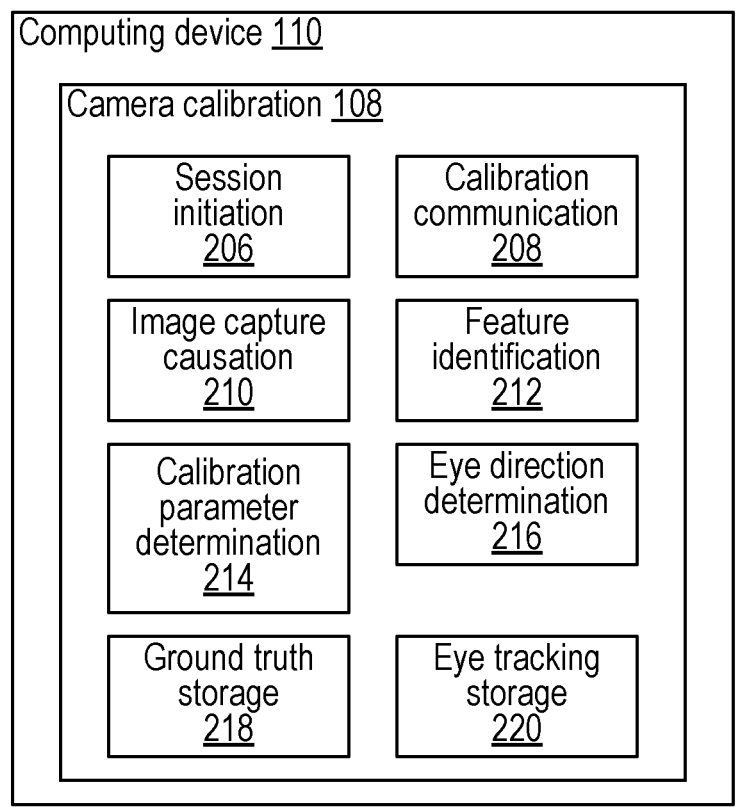
FIG. 2 is a block diagram illustrating example components of a camera calibration module that may be used to perform camera calibration, according to some embodiments.

FIG. 2 is a block diagram illustrating example components of a camera calibration module that may be used to perform camera calibration, according to some embodiments.

Some embodiments, such as shown in FIG. 1, may include further features such as shown in FIG. 2. For example, in some embodiments, camera calibration processes, such as those described herein, may be performed using processors that may execute program instructions related to steps of said camera calibration processes, such as in FIG. 2. In such embodiments, the computing device 110 comprising the camera calibration processes 108 may include further instructions such as, session initiation 206, calibration communication 208, image capture causation 210, feature identification 212, calibration parameter determination 214, eye direction determination 216, ground truth storage 218, and eye tracking storage 220. A person having ordinary skill in the art should understand that the computing device 110 comprising the camera calibration processes 108 may include other instructions not listed.

Session initiation 206, when executed, may cause the one or more processors to initiate a calibration session between a first device 104 and a second device 114 to calibrate one or more cameras 112*a* and 112*b* of the first device 104. Calibration communication 208, when executed, may cause the one or more processors to communicate, between the first device 104 and the second device 114, information for a calibration scheme to be displayed or currently displayed at the second device 114 and observable by the one or more cameras 112*a* and 112*b* of the first device 104. Image capture causation 210, when executed, may cause the one or more processors to cause one or more images 102*a* and 102*b* of the calibration scheme displayed on the second device 114 to be captured by the one or more cameras 112*a* and 112*b* of the first device 104.

Feature identification 212, when executed, may cause the one or more processors to cause features 118*a* and 118*b* in the captured one or more images 102*a* and 102*b* and respective distances between the identified features to be identified. Calibration parameter determination 214, when executed, may cause the one or more processors to cause one or more calibration parameters for the one or more cameras 112*a* and 112*b* of the first device 104 to be determined based on comparing a ground truth of the calibration scheme to the identified features and respective distances included in the captured images 102*a* and 102*b*.

Eye tracking storage 220 may store program instructions that, when executed, may cause the one or more processors to receive eye tracking information from an eye tracking module 304 of the first device 104, such as shown in FIGS. 3A-D, and to store the eye tracking information to a memory system, wherein a user is wearing the first device 104. Eye direction determination 216, when executed, may cause the one or more processors to determine, based on the eye tracking information stored in the memory system, that an eye direction of the user is directed away from the second device 114. The eye direction determination 216, when executed, may also cause the one or more processors to cause, in response to determining the eye direction of the user is directed away from the second device 114, the calibration scheme to be displayed on the second device 114.

Ground truth storage 218, when executed, may cause the one or more processors to store ground truth information, comprising the features 118*a* and 118*b* and respective distances separating the features. Additionally, ground truth storage 218 may store specification information that comprises display characteristics of the second device 114. For example, specification information for the display of the second device may include a pixel resolution of the second device, photon emission rates of the display of the second device, and various other relevant characteristics of the display that may be used in determining the camera calibration parameters.

FIGS. 3A-D illustrate receiving eye tracking information from an eye tracking module and using the eye tracking information to determine timing for displaying a calibration scheme at a second device, according to some embodiments.

Figure 3A:
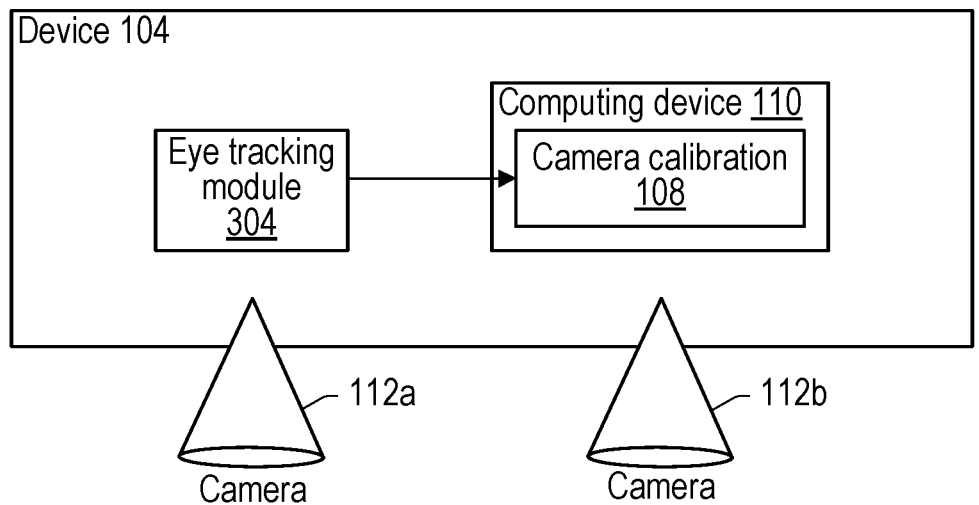
FIGS. 3A-D illustrate receiving eye tracking information from an eye tracking module and using the eye tracking information to determine timing for displaying a calibration scheme at a second device, according to some embodiments.
Figure 3A:
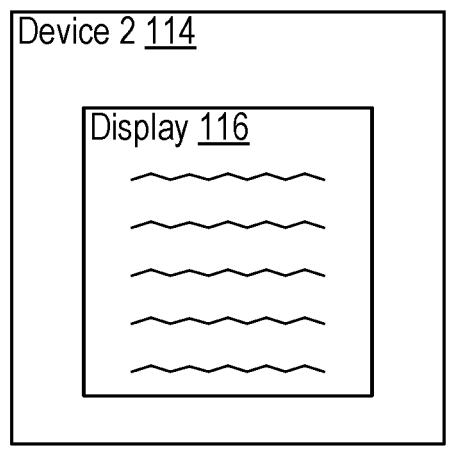
Figure 3B:
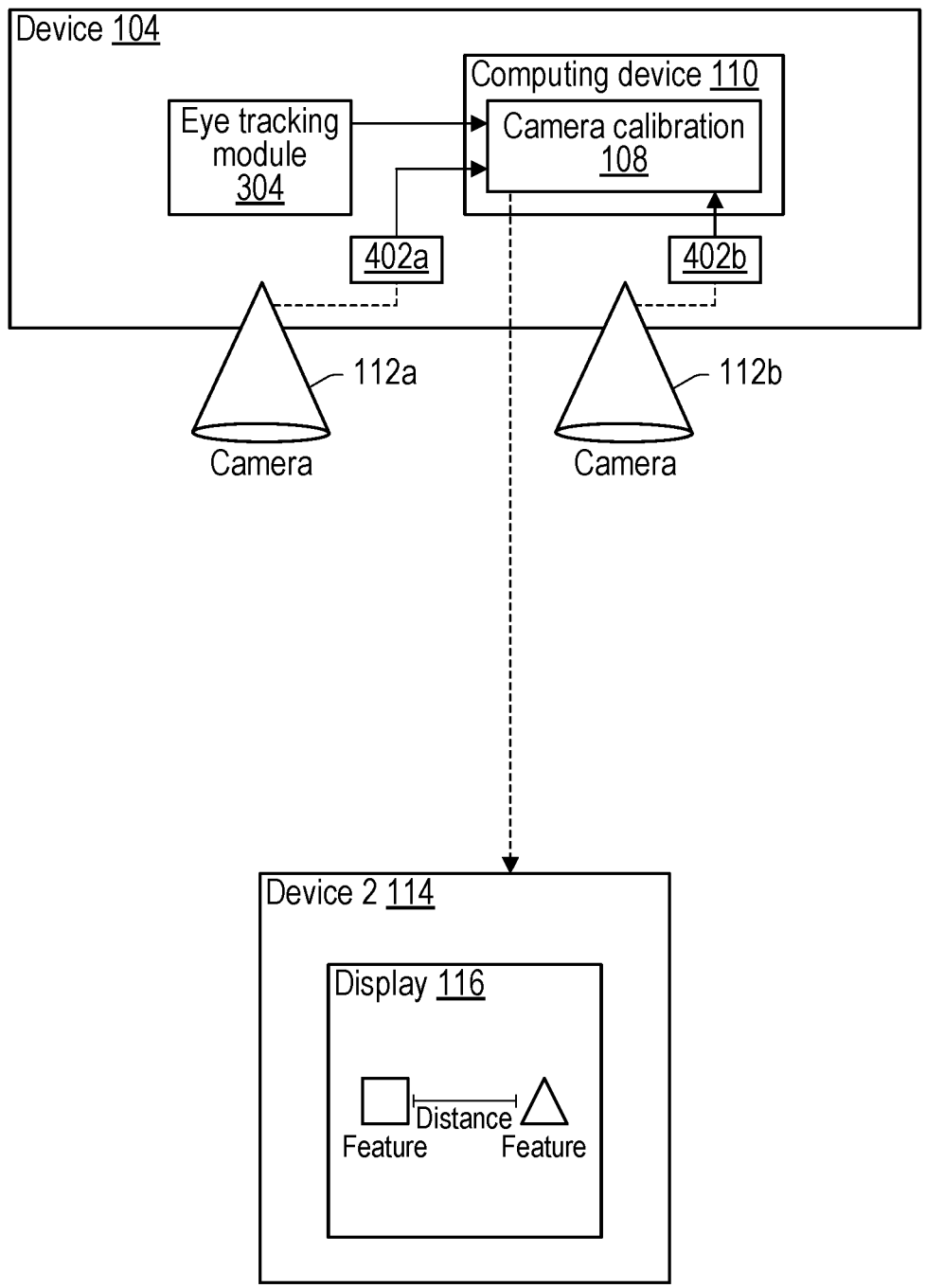

In some embodiments, such as those shown in FIGS. 1 and 2, a device and a second device may implement further features such as shown in FIGS. 3A-D. For example, in some embodiments, during a given calibration session, an eye tracking module 304 may provide eye tracking information to one or more camera calibration processes 108. For example, as shown in FIG. 3A, at Timestep 1, the one or more camera calibration processes 108 may determine that an eye direction of a user is directed away from a second device 114. At Timestep 1+J, as shown in FIG. 3B, the one or more camera calibration processes 108 in the computing device 110 may communicate with the second device 114 to display a calibration scheme that is known to the first device 104. The cameras 112*a* and 112*b* of the first device 104 may then capture images 402*a* and 402*b* of a display 116 of the second device 114 that is displaying the calibration scheme that is known to the first device 104.

Figure 3C:
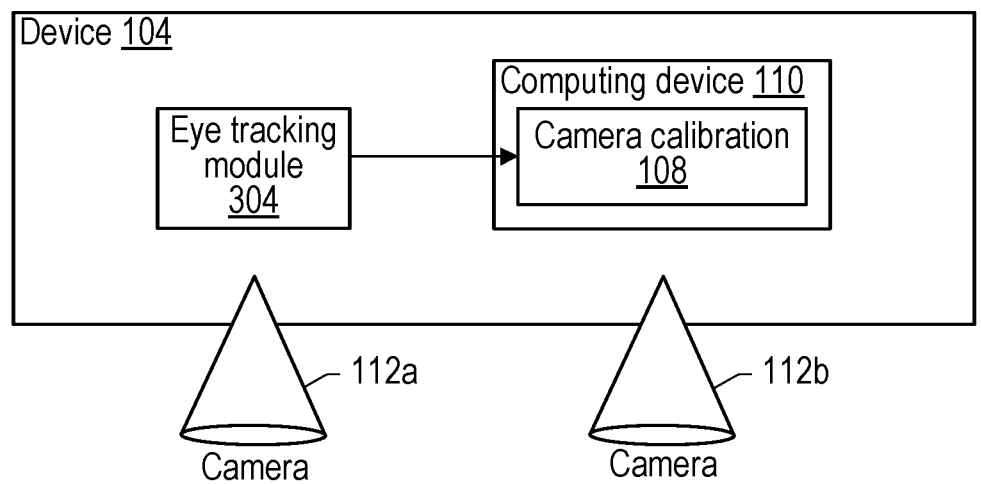
Figure 3C:
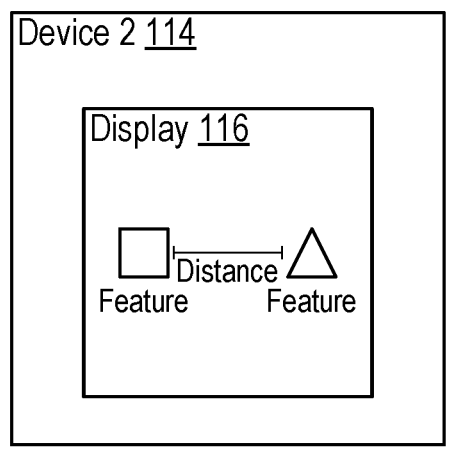
Figure 3D:
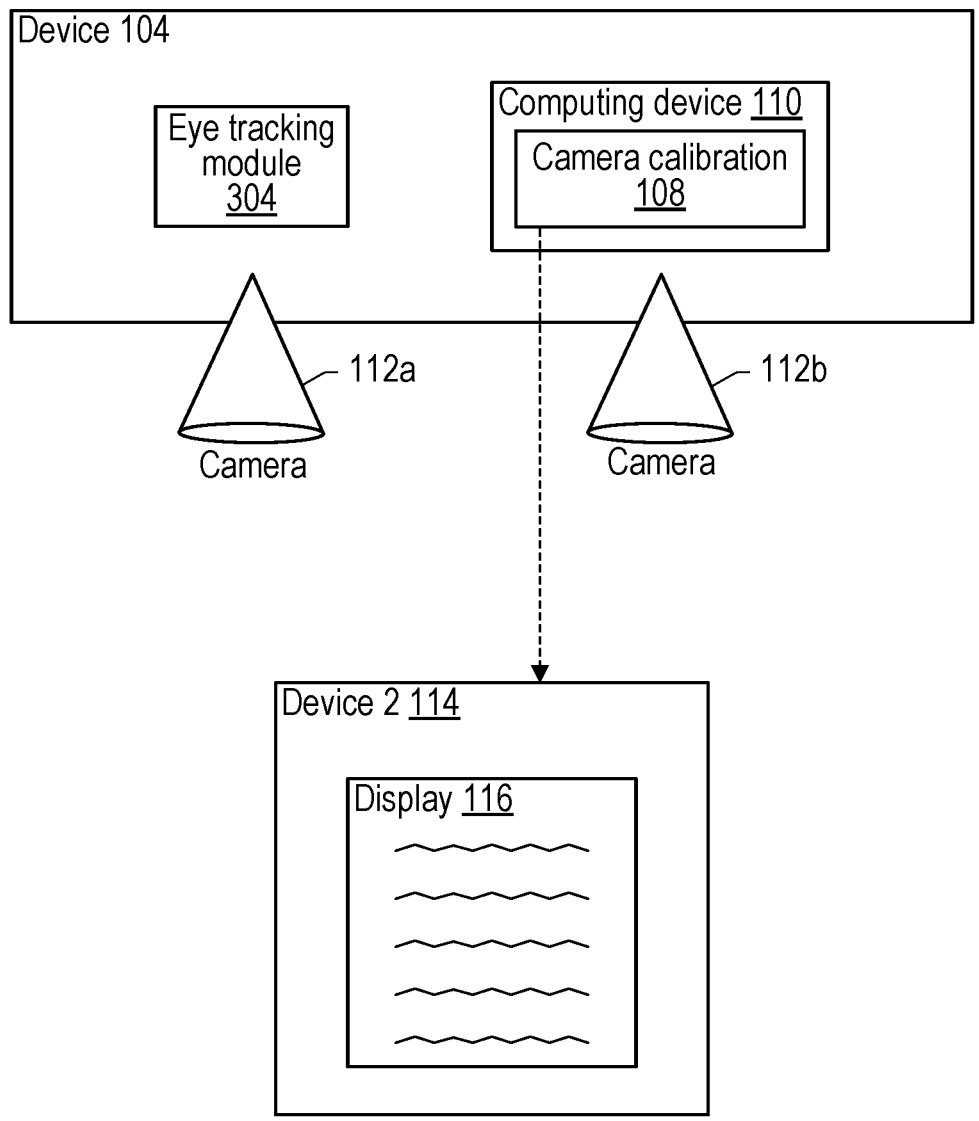

At Timestep 1+J+K, as shown in FIG. 3C, the one or more camera calibration processes 108 may determine that an eye direction of the user is directed back towards the second device 114, and in response, the one or more camera calibration processes 108 may communicate with the second device 114 to remove the calibration scheme from being displayed on the display 116 of the second device 114 at Timestep 1+J+K+L as shown in FIG. 3D, in response to determining the user is looking back at the second device.

Furthermore, Timestep 1, Timestep 1+J, Timestep 1+J+K, and Timestep 1+J+K+L may represent sequential moments in time (e.g., J, K, L may be time steps 1, 2, and 3) or asynchronous moments in time (e.g., J, K, L may be time steps 2, 5, 9, etc., respectively), according to some embodiments (e.g., a calibration session such as those discussed herein may not depend on using images captured at periodic moments in time, images captured at sequential moments in time, images captured with a certain frequency/repetition, etc.). For example, a calibration session may involve Timestep 1, Timestep 1+J, Timestep 1+J+K, and Timestep 1+J+K+L being repeated multiple times to provide enough information to the camera calibration processes 108 to be able to determine calibration parameters.

Figure 4:
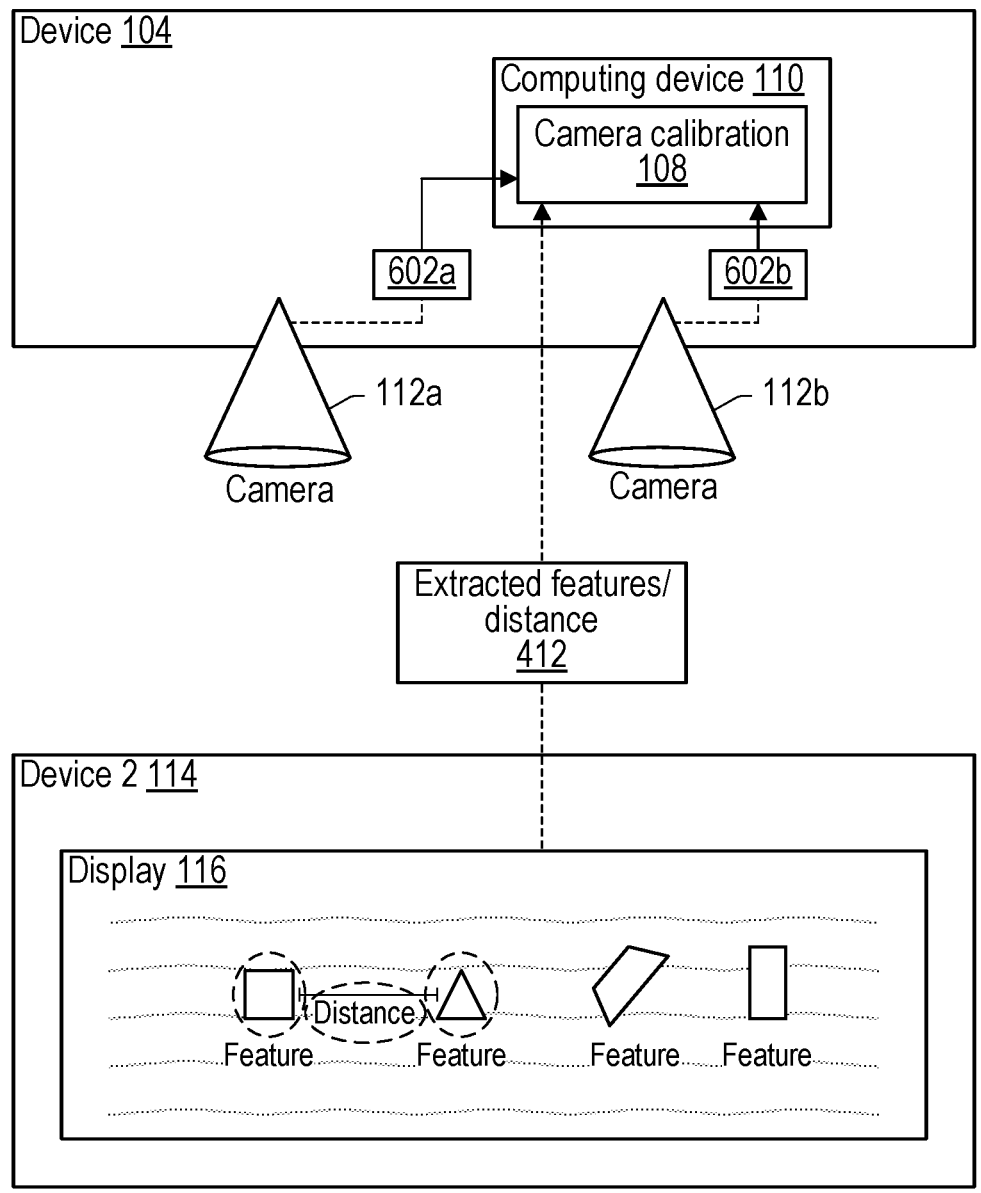
FIG. 4 illustrates a first device capturing images of a second device's display and the second device providing information indicating extracted features and respective distances separating the extracted features, according to some embodiments.

FIG. 4 illustrates a first device capturing images of a second device's display and the second device providing information indicating extracted features and respective distances separating the extracted features, according to some embodiments.

Some embodiments, such as those shown in FIGS. 1 through 3 may, further include further features such as shown in FIG. 4. For example, in some embodiments, such as shown in FIG. 4, a second device 114 may provide extracted features and respective distances separating the extracted features 412 displayed on the second device 114 to one or more camera calibration processes 108 of a computing device 110 of a given device 104.

In some embodiments, the extracted features and respective distances 412 may be extracted from images displayed by a user and communicated to the one or more camera calibration processes 108 without notification to the user. In some embodiments, two or more of the extracted features and the respective distances separating the two or more extracted features may be provided to the camera calibration processes 108 based on having feature quality scores greater than a threshold amount.

Figure 5:
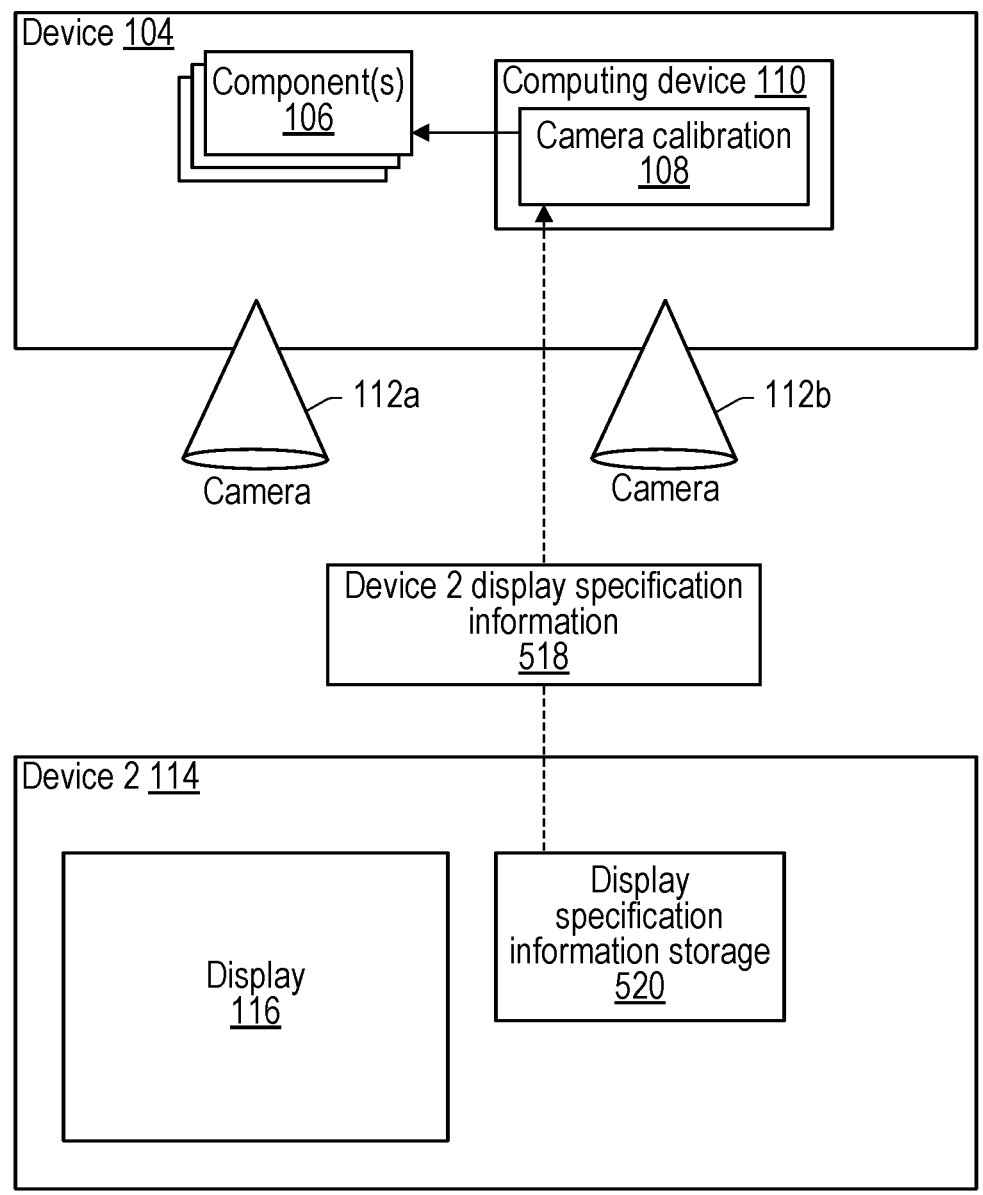
FIG. 5 illustrates a first device receiving specification information comprising display characteristics of a second device, according to some embodiments.

FIG. 5 illustrates a first device receiving specification information comprising display characteristics of a second device, according to some embodiments.

In some embodiments, such as shown in FIGS. 1 through 4, a first and second device may include further features, such as shown in FIG. 5. For example, in some embodiments, the second device 114 may comprise display specification information storage 520. A camera calibration process 108 of a computing device 110 in the first device 104 may receive display specification information for the second device 518. Such display specification information may include display characteristics of the second device 114. Receiving the specification information that includes display characteristics of the second device 114 may allow the camera calibration process 108 to combine the specification information with information comprising features and respective distances separating the features of the calibration scheme in order to create a known ground truth that may be used to compare against identified features and respective distances in one or more images from one or more cameras 112a and 112b of the first device 104 when determining one or more calibration parameters for the one or more cameras 112a and 112b of the first device 104. For example, in some embodiments, both the first device 104 and the second device 114 may be devices of a common eco-system (e.g., designed and/or manufactured by a related or same entity). In such embodiments, it may be the case that the first device 104 already has access to the display specification information for the second device 114. However, in other embodiments, the first device 104 and the second device 114 may be devices of different eco-systems, in which case the second device 114 may provide the first device 104 with device 2 display specification information 518 as part of the initiated calibration session.

Figure 6A:
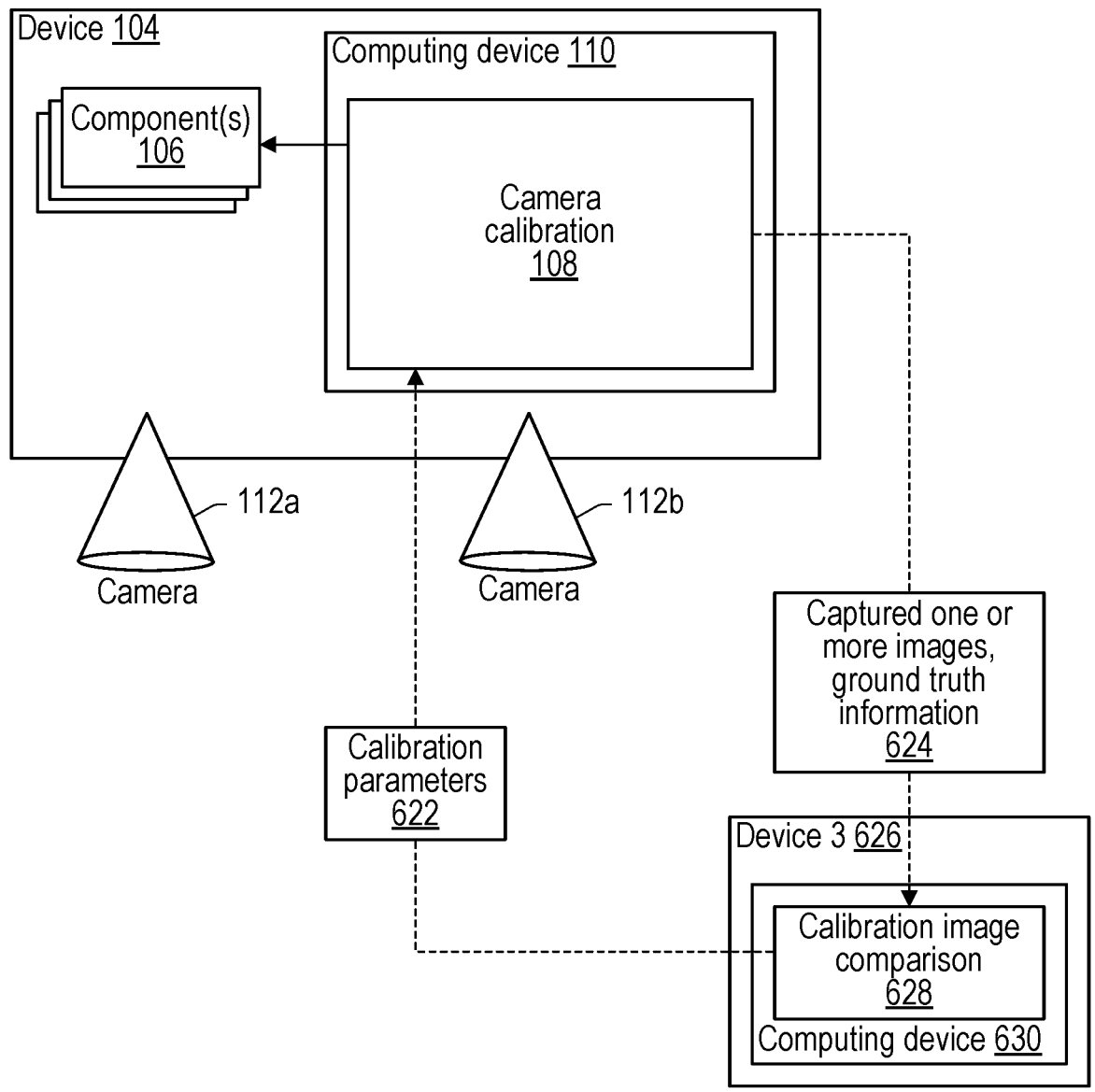
FIG. 6A illustrates a first device providing captured images and ground truth information to a third device and receiving determined calibration parameters from the third device, according to some embodiments.

FIG. 6A illustrates a first device providing captured images and ground truth information to a third device and receiving determined calibration parameters from the third device, according to some embodiments.

In some embodiments, such as shown in FIGS. 1 through 5, a given device and a third device may implement further features such as shown in FIG. 6A. For example, in some embodiments, a third device 626 may comprise a computing device 630 that implements a calibration image comparison process 628. During a given calibration session, a camera calibration process 108 in computing device 110 of the first device 104 may provide one or more captured images and ground truth information 624 of a second device, such as device 2 114 in FIG. 1, to the calibration image comparison process 628 of the computing device 630 in the third device 626. The calibration image comparison process 628 may provide determined calibration parameters 622 for one or more cameras 112a and 112b of the first device 104 to the camera calibration process 108 of the computing device 110 in the first device 104. The camera calibration process 108 may provide the determined calibration parameters 622 for the one or more cameras 112a and 112b of the first device 104 to one or more components 106 of the first device 104. In some embodiments, the camera calibration process 108 causing the third device 626 to identify the features in the one or more captured images and respective distances and causing the third device 626 to determine the one or more calibration parameters 622 for the cameras 112a and 112b of the first device 104 instead of the first device 104 performing these tasks offloads computational work to the third device 626 and may conserve the battery of the first device 104. Additionally (or alternatively), offloading the computational work may provide the first device 104 the opportunity to perform other computational work.

Figure 6B:
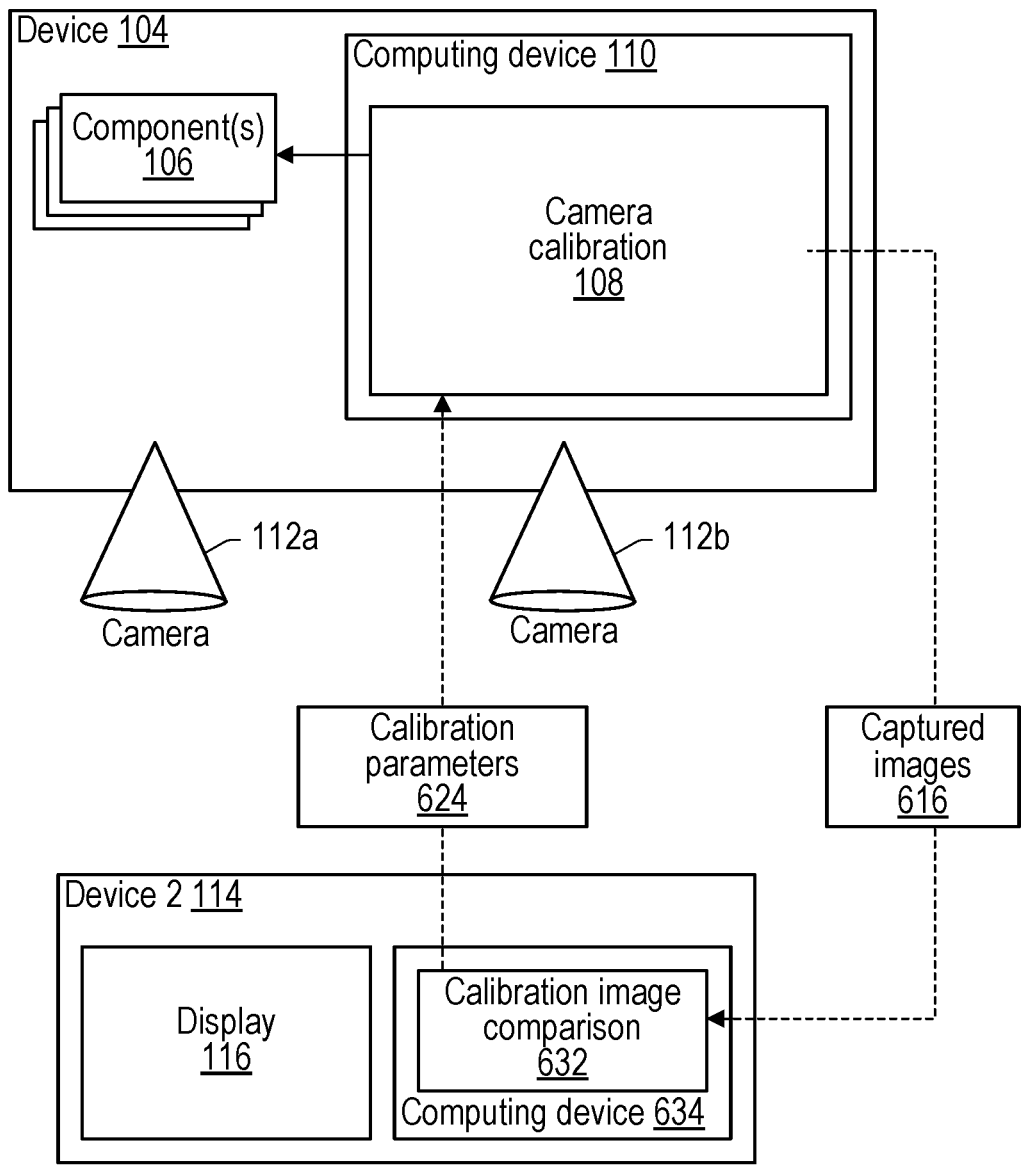
FIG. 6B illustrates a first device providing captured images to a second device and receiving determined calibration parameters from the second device, according to some embodiments.

FIG. 6B illustrates a first device providing captured images to a second device and receiving determined calibration parameters from the second device, according to some embodiments.

In some embodiments, such as shown in FIGS. 1 through 6A, a first and a second device may implement further features such as shown in FIG. 6B. For example, in some embodiments the second device 114 may comprise a computing device 634 comprising a calibration comparison process 632. During a given calibration session, a camera calibration process 108 of computing device 110 of the first device 104 may provide one or more captured images 616 of a display 116 of the second device 114 to the calibration comparison process 632 of the computing device 634 in the second device 114. The calibration comparison process 632 may provide determined calibration parameters 624 for one or more cameras 112a and 112b of the first device 104 to the camera calibration process 108 in the first device 104. The camera calibration process 108 may provide the determined calibration parameters 624 for the one or more cameras 112a and 112b of the first device 104 to one or more components 106 of the first device 104. Thus in some embodiments, at least some of the computational tasks may additional or alternatively offloaded to the second device 114.

Figure 7:
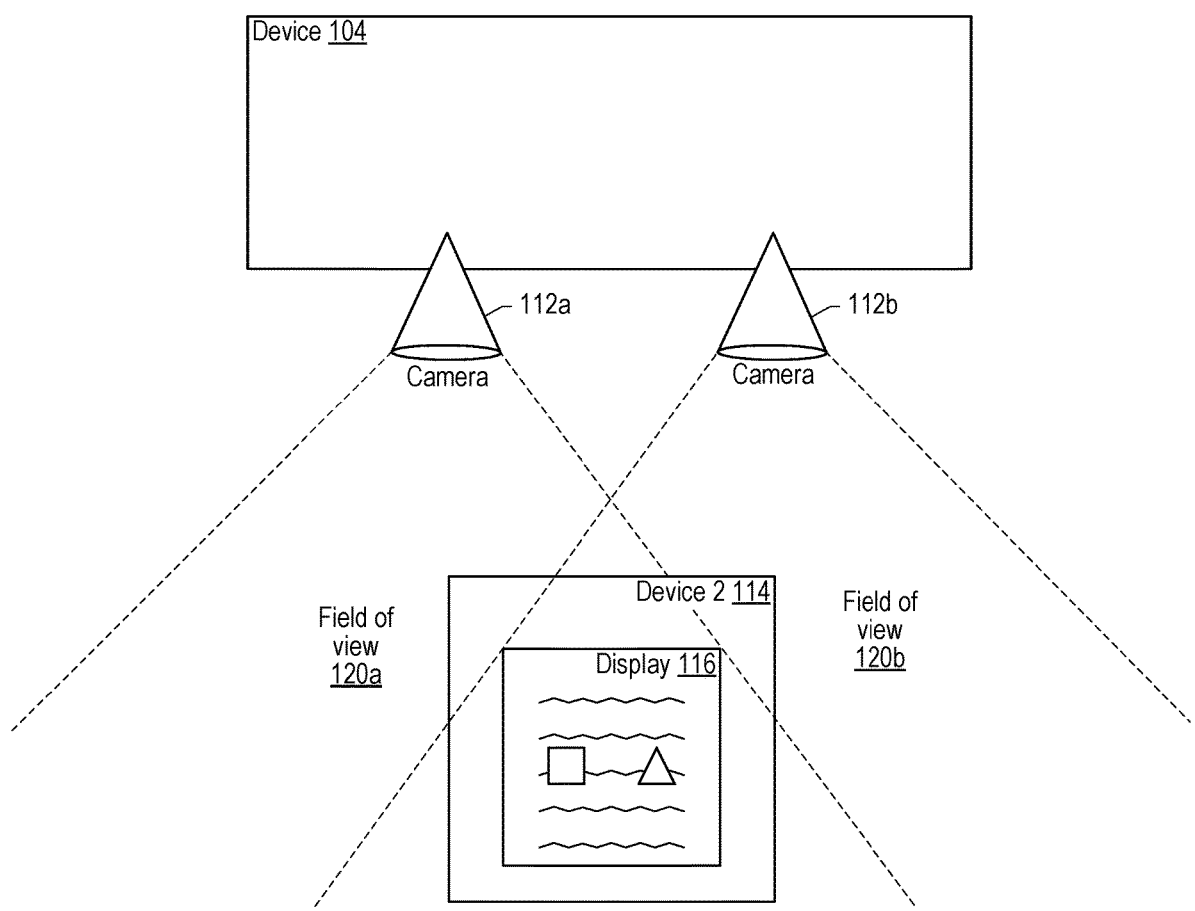
FIG. 7 illustrates cameras of a first device with overlapping fields of view, wherein a display of a second device is within the overlapping fields of view, according to some embodiments.

FIG. 7 illustrates cameras of a first device with overlapping fields of view, wherein a display of a second device is within the overlapping fields of view, according to some embodiments.

In some embodiments, such as shown in any of FIGS. 1 through 6B, a given device may have further features such as shown in FIG. 7. For example, in some embodiments, device 104 may include multiple cameras with overlapping fields of view. In such embodiments, cameras 112a and 112b may be referred to as "stereo" cameras (e.g., cameras that are in a stereoscopic configuration with one another), as they have at least partially overlapping fields of views. FIG. 7 depicts two cameras, however one camera or two or more cameras that have overlapping fields of view for a given scene concurrently. Images captured using the cameras with overlapping fields of view may be used within a given camera calibration session, according to some embodiments. In such embodiments with two or more cameras, displays used for a camera calibration process may be viewed in all respective fields of view of the multiple cameras, such as display 116 in FIG. 7. In the calibration session, a display 116 of a second device 114 may be within the overlapping fields of view of two or more cameras 112a and 112b. In some embodiments, camera calibration parameters may be used to determine extrinsic parameters of a first one of the cameras 112 relative to another one of the cameras 112. Also, in some embodiments in which three or more cameras have overlapping fields of view, some features on a display may be prioritized for selection even though they are within only two out of the three respective fields of view for two of the three cameras, for example. In such cases, a first camera may have part of an overlapping field of view with a second camera (but not with a third camera), and the second camera may also have another part of its field of view that overlaps with the third camera, creating linked chain of overlapping field of view. In such embodiments, camera calibration parameters may be used to determine linked extrinsic parameters that can be used to determine relative poses of one camera relative to one or more of the other cameras. In examples such as this, the features that may be used for the camera calibration process may be tracked in the two sets of overlapping fields of view of the multiple (e.g., three or more) cameras. In some embodiments, linked calibration information may be determined based on the tracking of the features in the two sets of overlapping fields of view of the multiple cameras. For example, a pose of camera 1 relative to camera 3 may be determined based on knowing the pose of the camera 1 relative to camera 2 and knowing the pose of the camera 3 relative to the camera 2.

Figure 8:
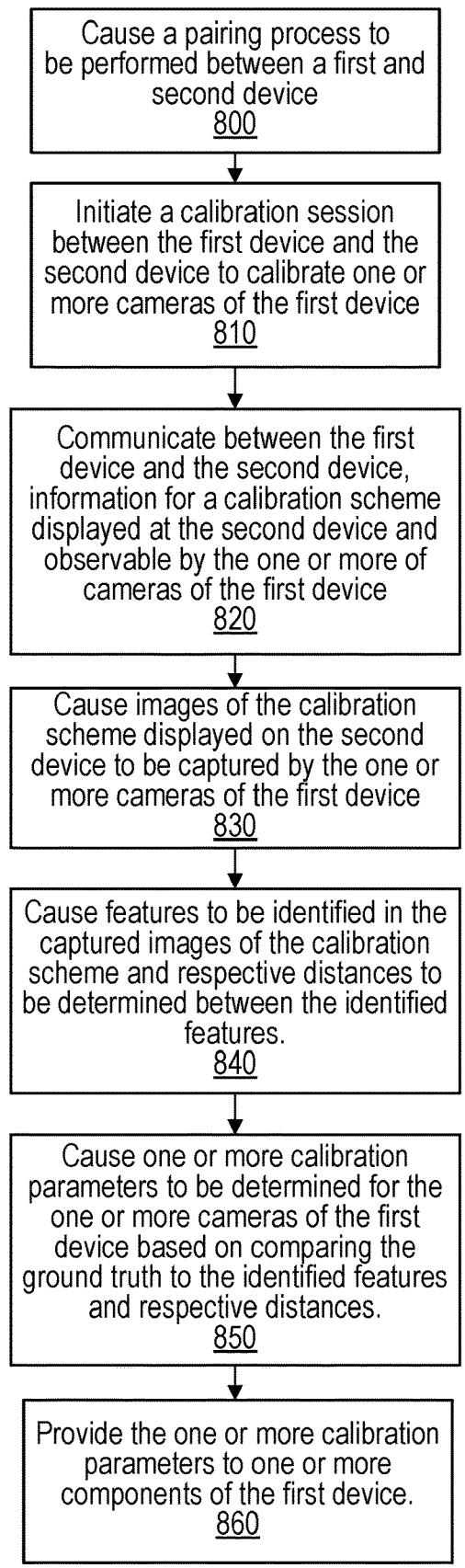
FIG. 8 is a flow diagram illustrating a process of performing a calibration session between two devices to calibrate one or more cameras on one of the respective devices, according to some embodiments.

FIG. 8 is a flow diagram illustrating a process of performing a calibration session between two devices to calibrate one or more cameras on one of the respective devices, according to some embodiments.

In some embodiments, a process of performing a calibration session between two devices to calibrate one or more cameras on one of the respective devices may resemble a process such as that which is shown in FIG. 8. In block 800, a pairing process may be caused to be performed between a first and second device. For example, the first device may determine that a calibration threshold has been reached, such as an amount of time since one or more cameras were last calibrated, a deviation in performance of one or more systems that use images from the cameras, an event detected by other sensors of the device, such as an inertial measurement unit (IMU), or various other calibration initiation events.

In some embodiments, a pairing process may include a handshake protocol wherein the first device and the second device exchange information, such as identity information, cryptographic information, or various other types of information that may be used to verify respective identities of the first and second device. Such a handshake protocol may prevent unauthorized devices from participating in a calibration session. In some embodiments, the paring may be performed using various wireless communication protocols, such as Wi-Fi, Bluetooth, etc.

In block 810, a calibration session between the first device and the second device may be initiated to calibrate a set of cameras of the first device. For example, once the first and second devices are paired at block 800, the first device may initiate a calibration session with the second device, wherein the first and second device coordinate to display a calibration scheme on the second device and coordinate such that the first device is made aware of the ground truth for features included in the calibration scheme to be displayed (or already displayed) on a display of the second device. In some embodiments, blocks 800 and 810 may represent a first part of a camera calibration process, wherein blocks 800 and 810 may be repeated a given number of times before proceeding to a next step of the calibration process, such as is shown in block 820 (as discussed in more detail herein with regard to FIG. 9). In block 820, information for a calibration scheme displayed at the second device and observable by one or more cameras of the first device may be communicated between the first device and the second device.

In block 830, images of a calibration scheme displayed on a second device may be caused to be captured by the one or more cameras of the first device. In some embodiments, blocks 820 and 830 may represent a middle part of a camera calibration process, wherein blocks 820 and 830 may be repeated a given number of times before proceeding to a next step of the calibration process, such as is shown in block 840 (as discussed in more detail herein with regard to FIG. 10).

In block 840, features may be caused to be identified in the captured images of the calibration scheme and respective distances between the identified features may be determined. In block 850 one or more calibration parameters may be caused to be determined for the one or more cameras of the first device based on comparing a ground truth to the identified features and the respective distances. After the one or more calibration parameters are determined, the one or more calibration parameters may be provided to one or more components of the first device as shown in block 860.

Figure 9:
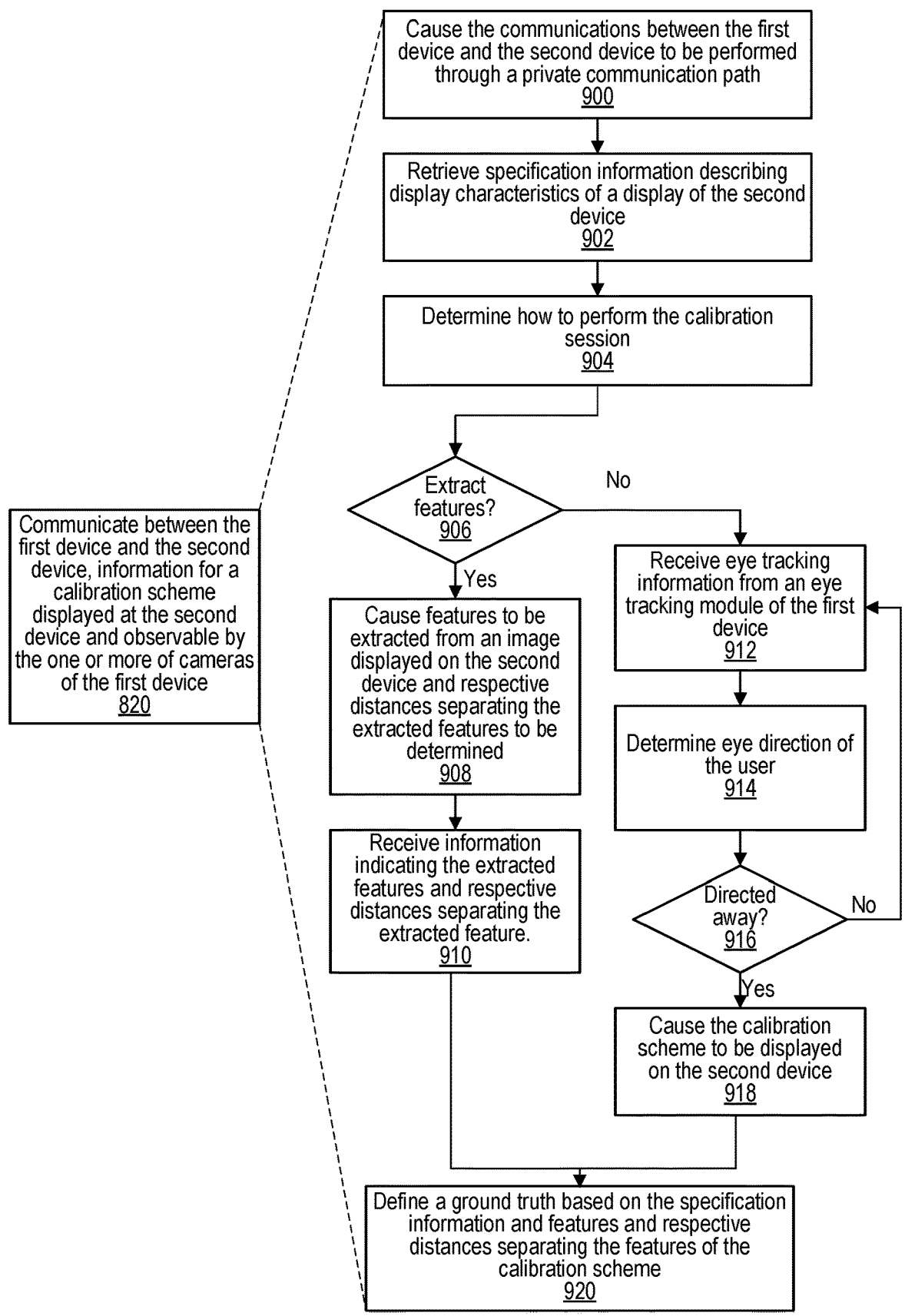
FIG. 9 is a flow diagram illustrating a process of communicating information for a calibration scheme displayed, or to be displayed, at the second device and observable by one or more cameras of the first device, according to some embodiments.

FIG. 9 is a flow diagram illustrating a process of communicating information for a calibration scheme displayed, or to be displayed, at the second device and observable by one or more cameras of the first device, according to some embodiments.

In some embodiments, a process of communicating information for a calibration scheme displayed, or to be displayed, at a second device and observable by one or more cameras of a first device may resemble a process such as that which is shown in FIG. 9. In some embodiments, block 820 may be performed once a calibration session is initiated, for example as described in FIG. 8. In block 820, as shown in FIG. 8, information for a calibration scheme displayed at the second device and observable by one or more cameras of the first device may be communicated between the first device and the second device. In some embodiments, block 820 may describe part of a calibration process, wherein block 820 may be repeated a given number of times before proceeding to block 830 (as discussed herein with regard to FIG. 10). Blocks 900 through 920 provide further details of how the process described in block 820 may be completed, in some embodiments. In block 900, communications between the first device and the second device may be caused to be performed through a private communication path, such as may have been established at block 800 via the pairing of the first and second device. In block 902, specification information describing display characteristics of a display of the second device may be retrieved and/or otherwise provided to the first device or a device to which the first device has delegated the performance of computational tasks associated with the calibration process. In block 904, the first device may determine how to perform the calibration session. For example, if there is an opportunity to perform the calibration using a known calibration chart that can be displayed on the second device while a user of the second device is not looking at the second device but while the cameras of the first device remain positioned such that the display of the second device are within a field of view of the one or more cameras of the first device, then a first calibration procedure using the known calibration chart may be performed. In contrast, if the user is looking at the second device display and there is not an opportunity to display the known calibration chart on the display of the second device without interrupting the user's use of the second device, a second calibration procedure may be performed. In the second calibration procedure, features displayed on the second device during the user's natural use of the second device may be extracted and communicated to the first device as ground truth features for use in performing the calibration process. Also, respective distances between the extracted features, extracted from an image displayed (or to be displayed) on the display of the second device may be provided to the first device as part of the ground truth information of the calibration scheme. For example, block 906 may be used to check if the calibration session is to be performed by extracting features or using the known calibration chart. If the calibration session is performed by extracting features, the calibration session may continue with blocks 908, 910, and 920. If the calibration session is not performed by extracting features, the calibration session may continue with blocks 912, 914, 916, 918, and 920. Two methods that may be used to complete a calibration session without notification to the user may be described with blocks 908 through 920. In some embodiments, feature extraction may be performed as a primary mechanism for determining ground truth and not necessarily as a secondary alternative as described above.

In block 908, features may be caused to be extracted from an image displayed on the second device and the respective distances separating the extracted features may be determined. For example, if an image displayed on the display of the second device was a text message that said "HELLO LEO", a feature extraction module of the second device may identify a corner in the second "L" of "HELLO" as a first feature and the corner in the L of "LEO" as a second feature. The feature extraction module of the second device may further determine a number of pixels separating the corner of the second "L" of "HELLO" from the corner of the first "L" of "LEO." These extracted features and respective distances may be sent to the first device (or a third device if the computational work of the calibration process is being offloaded to a third device). Note that the extracted features may be sent in a way that obfuscates the content being displayed on the display of the second device. For example, the extracted feature information sent between the devices may simply indicate a first corner and a second corner separated by a number of pixels. Because only the extracted feature information and distances is sent between the devices, the content of the original message displayed on the display of the second device cannot be recreated or inferred based on the communicated extracted features. For example, the first device will not be able to determine the content of the text message is "HELLO LEO" based on the extracted features, but instead can only determine that there are two corners separated by a number of pixels. In block 910, information indicating the extracted features and respective distances separating the extracted features may be received, for example at the first device, or a third device to which the computational work has been off-loaded to.

If at block 906, it is determined that features are not to be extracted but instead a known calibration chart is to be displayed on the display of the second device, then the process may proceed as shown in steps 912, 914, 916, 918, and 920. For example, in block 912, eye tracking information may be received from an eye tracking module of the first device. In block 914, an eye direction of the user may be determined. Block 916 may be used to check whether the eye direction of the user has been determined to be directed away from the second device. Blocks 912, 914, and 916 may be repeated multiple times until the eye direction of the user has been determined to be directed away from the second device. After determination that the eye direction of the user is directed away from the second device, the calibration scheme may be displayed on the second device, as described in block 918. In block 920, a ground truth based on the specification information and features and respective distances separating the features of the calibrations scheme may be defined. For example, information about the pixel resolution, pixel photon emittance rate, etc. of the display of the second device may be used in conjunction with a known calibration chart (if following steps 912 through 918) or may be used with extracted features and distances (if following steps 908 and 910) to define the ground truth. The features and locations of the features in the ground truth may then be compared to corresponding features and locations of the corresponding features in images captured by the cameras of the first device. Such comparisons may then be used to determine calibration parameters for the cameras of the first device, as further described below.

Figure 10:
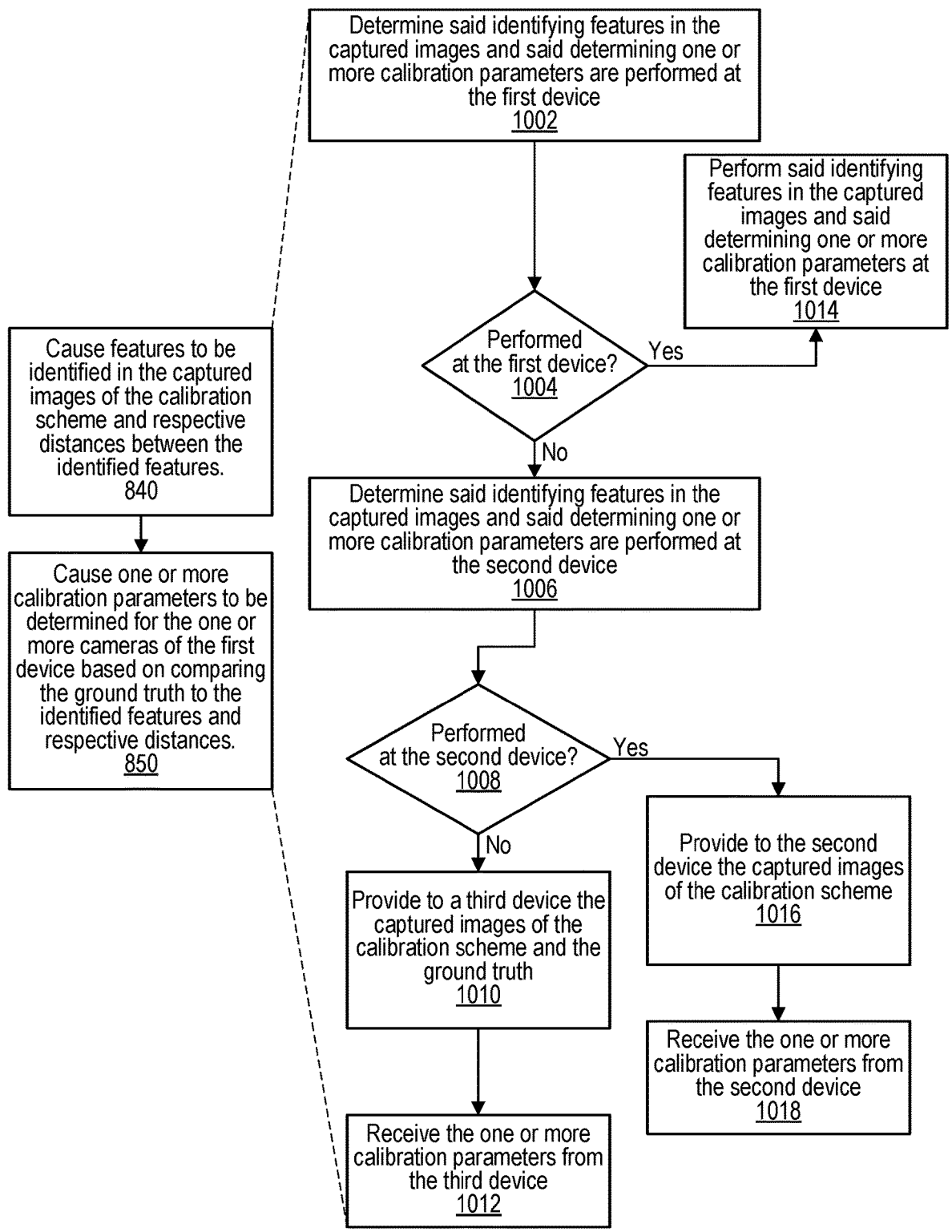
FIG. 10 is a flow diagram illustrating a process of determining calibration parameters for one or more cameras of the first device, according to some embodiments.

FIG. 10 is a flow diagram illustrating a process of determining calibration parameters for one or more cameras of the first device, according to some embodiments.

In some embodiments, a process of determining one or more calibration parameters for one or more cameras of a first device may resemble the process such as that which is shown in FIG. 10. In some embodiments, blocks 840 and 850 may be performed once images of a calibration scheme displayed on a second device are captured by the one or more cameras of the first device, for example described in FIG. 8. In block 840, features may be caused to be identified in the captured images of the calibration scheme and respective distances between the identified features may be determined. In block 850 one or more calibration parameters may be caused to be determined for the one or more cameras of the first device based on comparing a ground truth to the identified features and the respective distances. For example, geometric relationships between the features in the ground truth and in the captured images may be determined. These geometrical relationships may further be used to determine extrinsic or intrinsic parameters of the cameras of the first device. For example, such geometrical relationships may be used to determine a pose.

Blocks 1002-1018 provide further details of how the process described in blocks 840 and 850 may be completed, in some embodiments. In block 1002, it is determined whether the process of identifying the features and the process of determining the one or more calibration parameters is to be performed at the first device. For example, this determination may be made based on a battery level of the first device, an amount of available processing capacity and/or memory of the first device, or based on other factors related to the first device. Block 1004 checks if the process of identifying the features and the process of determining the one or more calibration is to be performed at the first device. If the process of identifying the features and the process of determining the one or more calibration is to be performed at the first device the process of identifying the features and the process of determining the one or more calibration proceeds to be performed at the first device with no changes as shown in block 1014. However, if the two processes are not to be performed at the first device, the two process may be determined to be performed, at least in part, at the second device as shown in block 1006. Block 1008 check if the two processes are to be performed at the second device. If the two processes are performed at the second device, the calibration session may continue with blocks 1016 and 1018. In block 1016, the second device may be provided with the captured images of the calibration scheme. In block 1018, the one or more calibration parameters may be received from the second device, where the computational task of determining the one or more calibration parameters has been offloaded to the second device. If the two processes are not to be performed at the second device (and also not to be fully performed at the first device), the calibration session may continue with blocks 1010 and 1012. In block 1010, a third device may be provided with the captured images of the calibration scheme and the ground truth. For example, another device, such as a laptop, desktop, or other computing device in wireless communication range or that has a network connection to the first or second device may be used to perform at least a portion of one or more of the computational tasks of the calibration process. In block 1012, the one or more calibration parameters may be received from the third device. Various combinations of processes described in FIGS. 8-10 may also be used to perform camera calibration processes that are included in the discussion herein.

Figure 11:
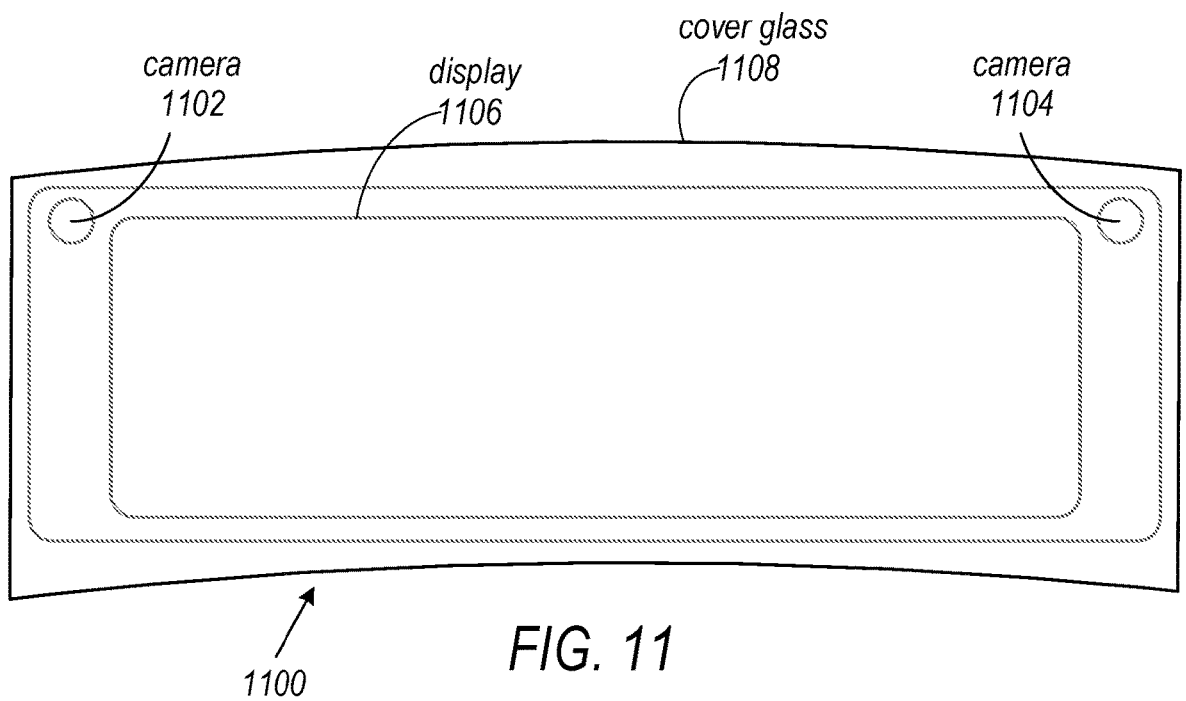
FIG. 11 illustrates an example head-mounted display (HMD) device comprising a frame onto which cameras may be mounted, according to some embodiments.
Figure 12:
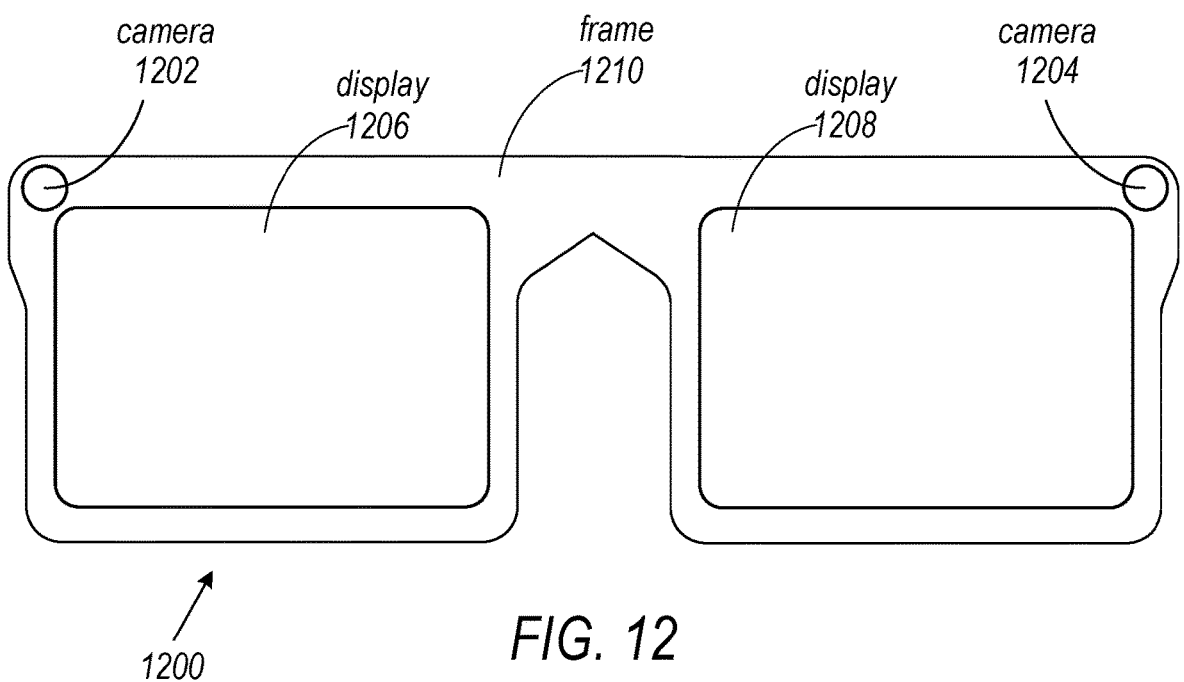
FIG. 12 illustrates another example of a head-mounted display (HMD) device comprising a frame onto which cameras may be mounted, according to some embodiments.

FIG. 11 illustrates an example head-mounted display (HMD) device comprising a frame onto which cameras, a cover glass, and an inertial measurement unit may be mounted, according to some embodiments, and FIG. 12 illustrates another example of a head-mounted display (HMD) device comprising a frame onto which cameras, a cover glass, and an inertial measurement unit may be mounted, according to some embodiments.

In some embodiments, methods and techniques for executing a camera calibration process may be implemented for cameras of devices 1100 and 1200, which may resemble extended reality (XR) glasses, goggles, and/or other head-mounted display device designs. Device 1100 may have a display for displaying in front of both eyes of the user, such as display 1106, in embodiments in which device 1100 has a goggles-like device frame. Alternatively, device 1200 may have respective displays 1206 and 1208 for each eye in embodiments in which device 1200 has a glasses-like device frame 1210. Devices 1100 and 1200 may be worn on a user's head such that the display(s) are placed in front of the user's eyes and may implement any of various types of display technologies or display systems in order to display images, video, or other content to the user of the device using said displays and/or lenses. In addition, device 1100 may have a cover glass, such as cover glass 1108, that may be placed in front of at least cameras 1102 and 1104 and provide protection for the cameras against the outside environment.

Devices 1100 and 1200 may have one or more cameras mounted to the respective frames, such as cameras 1102 and 1104 on device 1100 and cameras 1202 and 1204 on device 1200, which respectively have partially overlapping fields of view (e.g., "stereo" cameras). Methods for calibrating relative parameters of cameras (e.g., cameras 1102 and 1104, 1202 and 1204, and cameras 1302, 1304, and 1306 in the following FIGS. 13A and 13B) may resemble embodiments discussed with regard to at least FIGS. 1A-10 herein. Note that devices 1100 and 1200, and device 1300 in the following FIGS. 13A and 13B, are given by way of example, and are not intended to be limiting. In various embodiments, the shape, size, and other features of devices 1100 and 1200 may differ, as well as the locations, numbers, types, and other features of the components of said devices. For example, devices 1100 and 1200 may have respective inertial measurement units that are integrated into the devices (such as inertial measurement unit(s) 1460). Devices 1100 and 1200 may include additional sensors that may collect information about the user's environment (additional depth information, etc.) and/or about the user themselves (e.g., eye or gaze tracking) as well. In some embodiments, video streams of a real environment captured by cameras 1102, 1104, 1202, and 1204 may be processed by one or more processors located on devices 1100 or 1200, respectively, in order to render augmented or mixed reality frames that include virtual content overlaid on the view of the real environment, and rendered frames may then be provided to display system(s) (e.g., displays 1106, or 1206 and 1208, respectively).

Devices 1100 and 1200 may also be configured to receive input and/or other information via a wireless interface (e.g., network interface 740). One or more processors implemented locally on devices 1100 and 1200 may resemble various types of processors, image signal processors (ISPs), graphics processing units (GPUs), coder/decoders (codecs), system on a chip (SOC), CPUs, and/or other components for processing and rendering video and/or images, according to some embodiments. Processors of devices 1100 and 1200 may render frames that include virtual content based at least in part on inputs obtained from the sensors and/or cameras of devices 1100 and 1200, and may then provide the frames to the respective display systems.

Devices 1100 and 1200 may also include memory and/or local storage that may be used to record video and/or images captured by cameras 1102 and 1104, or 1206 and 1208, respectively. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments, DRAM may be used as temporary storage of images or video for processing, but other storage options may be used in an HMD to store processed data, such as Flash or other "hard drive" technologies.

FIGS. 13A and 13B illustrate a front and rear view, respectively, of an example device onto which multiple cameras and an inertial measurement unit may be incorporated, according to some embodiments.

In some embodiments, device 1300 may act as a second or third device in a calibration process. In some embodiments, the methods and techniques for executing a camera calibration process may also be implemented for cameras of device 1300. Device 1300 may have similar display and image processing functionalities such as those described above with regard to devices 1100 and 1200, however device 1300 may resemble a tablet or smartphone rather than a head-mounted display. In particular, device 1300 may have multiple outward facing cameras, such as camera 1302 on the front of device 1300 and cameras 1304 and 1306 on the back of device 1300. Device 1300 may also have an inertial measurement unit that may be used as input to a camera calibration process for cameras 1302, 1304, and 1306 that may be located inside of the device frame (not depicted in the views shown in FIGS. 13A or 13B). In some embodiments, distinct camera calibration processes may exist for device 1300: a first calibration process for front-facing camera 1302 (e.g., a calibration process such as the calibration processes described with regard to FIGS. 1-10 herein), and a second calibration process for one or more of the rear-facing cameras 1304 and 1306. For the rear-facing cameras 1304 and 1306, each camera may be calibrated separately or concurrently (e.g., using a calibration process such as the calibration process described with regard to FIGS. 1-10 herein). As camera 1302 does not have an overlapping field of view with cameras 1304 or 1306 by nature of camera 1302 facing 180° away from cameras 1304 and 1306, the calibration processes may occur separately, even if they both make use of the same inertial measurement unit (e.g., inertial measurement unit(s) 1460) of device 1400.

Figure 14:
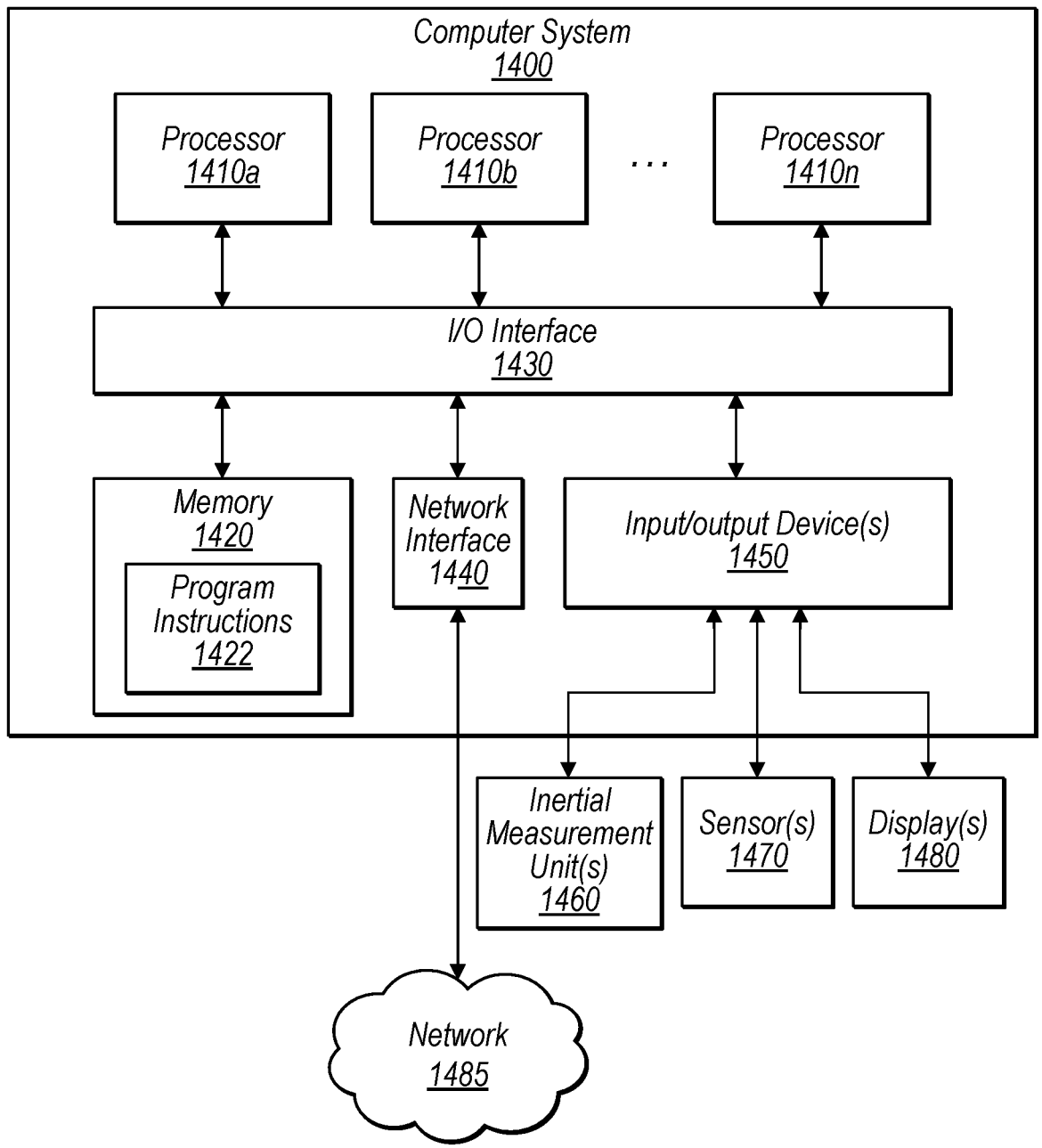
FIG. 14 is a block diagram illustrating an example computing device that may be used in at least some embodiments.

FIG. 14 is a block diagram illustrating an example computing device that may be used in at least some embodiments.

FIG. 14 illustrates exemplary computer system 1400 to perform camera calibration processes such as those described above with regard to FIGS. 1-13B. In different embodiments, computer system 1400 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of program instructions for performing calibration processes, tracking points of interest, and providing/broadcasting camera calibration results, as described herein, may be executed in one or more computer systems 1400, which may interact with various other devices, such as a LiDAR. Note that any component, action, or functionality described above with respect to FIGS. 1-13B may be implemented on one or more computers configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as sensor(s) 1470 (cameras 112*a* and 112*b*), display(s) 1480 (e.g., displays 1106, 1206, and 1208), and inertial measurement unit(s) 1460. Inertial measurement unit(s) 1460 may comprise three orthogonal gyroscopes that measure rotational velocity of the device and three orthogonal accelerometers that measure the acceleration along corresponding axes of the device that may be used to further calculate position and orientation of the device by integrating these signals of the inertial measurement unit, according to some embodiments. These position and orientation values may then be used to reference cameras respect to inertial measurement unit(s) 1460, according to some embodiments.

In some cases, it is contemplated that embodiments may be implemented using a single instance of computer system 1400, while in other embodiments multiple such computer systems, or multiple nodes making up computer system 1400, may be configured to host different portions or instances program instructions for performing camera calibrations as described above for various embodiments. For example, in some embodiments, some elements of the program instructions may be implemented via one or more nodes of computer system 1400 that are distinct from those nodes implementing other elements.

In some embodiments, computer system 1400 may be implemented as a system on a chip (SoC). For example, in some embodiments, processors 1410, memory 1420, I/O interface 1430 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1420 may be configured to store program instructions 1422 for calibration processes and/or sensor data accessible by processor 1410. In various embodiments, system memory 1420 may be implemented using any suitable memory technology, such as static random-access memory (SRAM), synchronous dynamic RAM (SDRAM), nonvolatile/Flash-type memory, or any other type of memory. In the illustrated embodiment, program instructions 1422 may be configured to implement any of the functionality described above. In some embodiments, program instructions and/or data may be received, sent or stored upon different types of computer-accessible media or on similar media separate from system memory 1420 or computer system 1400.

In some embodiments, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 (e.g., carrier or agent devices) or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, inertial measurement unit(s), sensors, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1422, which may be processor-executable to implement any element or action described above. In one embodiment, the program instructions may implement the methods described above. In other embodiments, different elements and data may be included.

Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked, and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

Virtual Reality

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing an HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

Augmented Reality and Mixed Reality

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory, computer-readable medium storing program instructions that, when executed using one or more processors, cause the one or more processors to:
   initiate a calibration session between a first electronic device and a second electronic device to calibrate a set of one or more cameras of the first electronic device;
   communicate, via one or more communications between the first electronic device and the second electronic device, information for a calibration scheme to be displayed or currently displayed at the second electronic device and observable by the set of one or more cameras of the first electronic device, wherein the calibration scheme comprises a ground truth comprising features pertaining to the second electronic device and respective distances between the features;
   cause one or more images of the calibration scheme displayed on the second electronic device to be captured by the set of one or more cameras of the first electronic device;
   identify features in the captured one or more images of the calibration scheme and respective distances between the identified features; and
   determine one or more calibration parameters for respective ones of the set of one or more cameras of the first electronic device based on comparing the ground truth to the identified features and respective distances.

2. The non-transitory, computer-readable medium of claim 1, wherein the program instructions, when executed using the one or more processors, cause the one or more processors to perform the calibration session without notification to a user.

3. The non-transitory, computer-readable medium of claim 2, wherein to perform the calibration session without notification to the user, the program instructions, when executed using the one or more processors, further cause the one or more processors to:
   receive eye tracking information from an eye tracking module of the first electronic device, wherein the user is wearing the first electronic device;
   determine, based on the eye tracking information, that an eye direction of the user is directed away from the second electronic device; and
   cause, in response to determining the eye direction of the user is directed away from the second electronic device, the calibration scheme to be displayed on the second electronic device, wherein the calibration scheme is a known image comprising the features and the respective distances of a known ground truth.

4. The non-transitory, computer-readable medium of claim 2, wherein to perform the calibration session without notification to the user, the program instructions, when executed using the one or more processors, further cause the one or more processors to:
   cause, as part of communication of the information for the calibration scheme, features to be extracted from an image displayed on the second electronic device and respective distances separating the extracted features to be determined; and
   receive information indicating two or more of the extracted features and respective distances separating the two or more of the extracted features, wherein the two or more of the extracted features and the respective distances separating the two or more of the extracted features are used as the ground truth.

5. The non-transitory, computer-readable medium of claim 4, wherein the information indicating the two or more of the extracted features and the respective distances separating the two or more of the extracted features comprises respective ones of the extracted features having feature quality scores greater than a threshold amount.

6. The non-transitory, computer-readable medium of claim 4, wherein the information indicating the two or more of the extracted features and the respective distances separating the two or more of the extracted features comprises respective ones of the extracted features that have been anonymized such that the two or more extracted features communicated between the second electronic device and the first electronic device do not include personally identifiable information.

7. The non-transitory, computer-readable medium of claim 1, wherein the program instructions, when executed using the one or more processors, further cause the one or more processors to cause the one or more communications between the first electronic device and second electronic device to be performed through a private communication path.

8. The non-transitory, computer-readable medium of claim 2 wherein to initiate the calibration session, the program instructions, when executed using the one or more processors, further cause the one or more processors to cause a pairing process to be performed between the first electronic device and second electronic device.

9. A device, comprising:
   a set of one or more cameras;
   one or more processors; and
   a memory, storing program instructions that when executed using the one or more processors, cause the one or more processors to:
      initiate a calibration session between the device and a second device to calibrate the set of one or more cameras of the device;
      communicate, via one or more communications between the device and the second device, information for a calibration scheme to be displayed or currently displayed at the second device and observable by the set of one or more cameras of the device, wherein the calibration scheme comprises a ground truth comprising features pertaining to the second device and respective distances between the features;
      cause one or more images of the calibration scheme displayed on the second device to be captured by the set of one or more cameras of the device;

cause features to be identified in the captured one or more images of the calibration scheme and respective distances between the identified features;

cause one or more calibration parameters to be determined for respective ones of the set of one or more cameras of the device based on comparing the ground truth to the identified features and respective distances; and provide the determined one or more calibration parameters to one or more components of the device.

10. The device of claim 9, wherein the program instructions, when executed using the one or more processors, cause the one or more processors to perform the calibration session without notification to a user.

11. The device of claim 10, wherein to perform the calibration session without notification to the user, the program instructions, when executed using the one or more processors, further cause the one or more processors to:

receive eye tracking information from an eye tracking module of the device, wherein the user is wearing the device;

determine, based on the eye tracking information, that an eye direction of the user is directed away from the second device; and cause, in response to determining the eye direction of the user is directed away from the second device, the calibration scheme to be displayed on the second device, wherein the calibration scheme is a known image comprising the features and the respective distances of a known ground truth.

12. The device of claim 10, wherein to perform the calibration session without notification to the user, the program instructions, when executed using the one or more processors, further cause the one or more processors to:

cause, as part of communication of the information for the calibration scheme, features to be extracted from an image displayed on the second device and respective distances separating the extracted features to be determined; and receive information indicating two or more of the extracted features and respective distances separating the two or more of the extracted features, wherein the two or more of the extracted features and the respective distances separating the two or more of the extracted features are used as the ground truth.

13. The device of claim 9, wherein:

the set of one or more cameras comprises two or more cameras; and a display of the second device is within an overlapping field of view of two or more cameras of the set of two or more cameras of the device.

14. The device of claim 9, wherein to cause the features to be identified and to cause the one or more calibration parameters to be determined, the program instructions, when executed using the one or more processors, cause the one or more processors to:

provide to a third device the captured one or more images of the calibration scheme and respective distances between the identified features;

provide to the third device information indicating the ground truth used in the calibration scheme; and receive the one or more calibration parameters from the third device.

15. The device of claim 9, wherein to cause the features to be identified and to cause the one or more calibration parameters to be determined, the program instructions, when executed using the one or more processors, cause the one or more processors to:

provide to the second device the captured one or more images of the calibration scheme and respective distances between the identified features; and receive the one or more calibration parameters from the second device.

16. The device of claim 9, wherein said identifying features in the captured one or more images and said determining the one or more calibration parameters are performed at the device.

17. The device of claim 9, wherein the device and the second device are manufactured by a same company.

18. The device of claim 9, wherein to communicate information for the calibration scheme, the program instructions, when executed using the one or more processors, further cause the one or more processors to:

retrieve specification information describing display characteristics of a display of the second device; and define the ground truth based on the display characteristics of the display of the second device and an image to be displayed or displayed on the display of the second device during the calibration session.

19. The device of claim 9, further comprising:

one or more displays, wherein providing the determined one or more calibration parameters to one or more components of the device comprises:

storing the determined one or more calibration parameters in a memory of the device, wherein the one or more components of the device are configured to use the determined one or more calibration parameters stored in the memory to adjust image data from the one or more cameras, and wherein the one or more displays are configured to display images generated by the one or more components using the adjusted image data.

20. A method, comprising:

initiating a calibration session between a first electronic device and a second electronic device to calibrate a set of one or more cameras of the first electronic device;

communicating, via one or more communications between the first electronic device and the second electronic device, information for a calibration scheme to be displayed or currently displayed at the second electronic device and observable by the set of one or more cameras of the first electronic device, wherein the calibration scheme comprises a ground truth comprising features pertaining to the second electronic device and respective distances between the features;

causing one or more images of the calibration scheme displayed on the second electronic device to be captured by the set of one or more cameras of the first electronic device;

identifying features in the captured one or more images of the calibration scheme and respective distances between the identified features; and determining one or more calibration parameters for respective ones of the set of one or more cameras of the first electronic device based on comparing the ground truth to the identified features and respective distances.

* * * * *